US011132635B2

(12) United States Patent
Staton et al.

(10) Patent No.: US 11,132,635 B2
(45) Date of Patent: *Sep. 28, 2021

(54) SYSTEMS AND METHODS FOR RECEIVING PACKAGES DELIVERED BY UNMANNED VEHICLES

(71) Applicant: NEWTONOID TECHNOLOGIES, L.L.C., Liberty, MO (US)

(72) Inventors: Fielding B. Staton, Liberty, MO (US); David Strumpf, Columbia, MO (US)

(73) Assignee: Newtonoid Technologies, L.L.C., Liberty, MO (US)

(*) Notice: Subject to any disclaimer, the term of this patent is extended or adjusted under 35 U.S.C. 154(b) by 427 days.

This patent is subject to a terminal disclaimer.

(21) Appl. No.: 16/036,747

(22) Filed: Jul. 16, 2018

(65) Prior Publication Data
US 2019/0043007 A1 Feb. 7, 2019

Related U.S. Application Data

(63) Continuation of application No. 15/669,875, filed on Aug. 4, 2017, now Pat. No. 10,026,054.

(51) Int. Cl.
*G06Q 10/08* (2012.01)
*B64C 39/02* (2006.01)
(Continued)

(52) U.S. Cl.
CPC ....... *G06Q 10/0832* (2013.01); *B64C 39/024* (2013.01); *B65D 5/36* (2013.01);
(Continued)

(58) Field of Classification Search
CPC .............. G06Q 10/0832; G06Q 10/083; B64C 39/024; B64C 2201/128; B64D 1/02;
(Continued)

(56) References Cited

U.S. PATENT DOCUMENTS 4,444,290 A * 4/1984 Valerio, Jr. .............. A62B 1/20
182/48
6,497,317 B1 12/2002 Chun
(Continued)

FOREIGN PATENT DOCUMENTS

WO 2014080390 A2 5/2014
WO WO-2014080390 A2 * 5/2014 ........... G06Q 10/083
(Continued)

OTHER PUBLICATIONS

Wikipedia 'winch' webpage <https://en.wikipedia.org/wiki/Winch> (<http://web.archive.org/web/20160411190949/https://en.wikipedia.org/wiki/Winch> captured on Apr. 11, 2016). (Year: 2016).*

(Continued)

*Primary Examiner* — Michael P Harrington
*Assistant Examiner* — Brian A Tallman
(74) *Attorney, Agent, or Firm* — Avant Law Group, LLC

(57) ABSTRACT

An apparatus for receiving a package delivered by an unmanned aerial vehicle comprises a collapsible package receiver adapted to be movably coupled to a building. The collapsible package receiver is configured to be placed from a collapsed position to a pop-out position to receive the package from the unmanned aerial vehicle. The apparatus has a memory associated with the package receiver which stores computer-readable instructions. A processor is configured to execute the instructions to: (a) determine a characteristic of the package delivered by the unmanned aerial vehicle to the package receiver; and (b) notify a user of the delivery of the package.

20 Claims, 16 Drawing Sheets

(51) Int. Cl.
  B65D 5/36 (2006.01)
  A47G 29/14 (2006.01)
  B65D 25/00 (2006.01)
  B64D 1/22 (2006.01)
  B64D 1/02 (2006.01)

(52) U.S. Cl.
  CPC ........... B65D 25/00 (2013.01); G06Q 10/083 (2013.01); *A47G 29/14* (2013.01); *A47G 2029/146* (2013.01); *B64C 2201/128* (2013.01); *B64D 1/02* (2013.01); *B64D 1/22* (2013.01)

(58) Field of Classification Search
  CPC . B64D 1/22; B65D 5/36; B65D 25/00; B65D 29/00; B65D 29/04; A47G 2029/146; A47G 29/14; E04H 12/32; G09F 2017/0066
  USPC ............................... 705/330–332; 232/20–21
  See application file for complete search history.

(56) References Cited

U.S. PATENT DOCUMENTS

| | | | |
|---|---|---|---|
| 9,731,839 | B1 | 8/2017 | Beckman et al. |
| 10,093,454 | B1* | 10/2018 | Kalyan ................... A47G 29/14 |
| 10,501,205 | B1* | 12/2019 | Siewert ..................... B64F 1/32 |
| 2004/0154869 | A1 | 8/2004 | May |
| 2005/0192958 | A1 | 9/2005 | Widjojo et al. |
| 2007/0163733 | A1 | 7/2007 | Phillips |
| 2012/0269461 | A1* | 10/2012 | Proctor ................... G09F 23/00 383/64 |
| 2015/0158599 | A1 | 6/2015 | Sisko |
| 2015/0175276 | A1 | 6/2015 | Koster |
| 2015/0183528 | A1 | 7/2015 | Walsh et al. |
| 2015/0317596 | A1 | 11/2015 | Hejazi |
| 2015/0321595 | A1 | 11/2015 | Hempsch et al. |
| 2016/0033966 | A1* | 2/2016 | Farris ................... A47G 29/141 701/15 |
| 2016/0068277 | A1 | 3/2016 | Manitta |
| 2016/0159496 | A1 | 6/2016 | O'Toole |
| 2016/0189101 | A1 | 6/2016 | Kantor et al. |
| 2016/0235236 | A1 | 8/2016 | Byers et al. |
| 2016/0289998 | A1* | 10/2016 | Huang .................... E04H 15/34 |
| 2016/0331171 | A1* | 11/2016 | Jiang ................... G06Q 10/0833 |
| 2016/0371642 | A1 | 12/2016 | Wilkinson |
| 2017/0039510 | A1* | 2/2017 | Ogilvie ................... G07F 17/12 |
| 2017/0091710 | A1 | 3/2017 | Van Dyke |
| 2017/0116568 | A1* | 4/2017 | Pleis .................. G06Q 10/0832 |
| 2017/0127868 | A1 | 5/2017 | Adewuyi |
| 2017/0147975 | A1 | 5/2017 | Natarajan et al. |
| 2017/0158353 | A1* | 6/2017 | Schmick ................. B60L 53/12 |
| 2017/0175413 | A1 | 6/2017 | Curlander et al. |
| 2017/0228692 | A1 | 8/2017 | Pargoe |
| 2017/0255896 | A1* | 9/2017 | Van Dyke ............ A47G 29/141 |
| 2019/0039751 | A1* | 2/2019 | Janssen ................ A47G 29/124 |

FOREIGN PATENT DOCUMENTS

| | | |
|---|---|---|
| WO | 2016094067 A1 | 6/2016 |
| WO | 2017085316 A1 | 5/2017 |

OTHER PUBLICATIONS

Lavars, Nick; "Drone delivery nets could be the mailboxes of the future" http://www.gizmag.com/drone-delivery-nets-skynet/34809/ >; Nov. 18, 2014 (<http://web.archive.org/web/20141119040709/ http://www.gizmag.com- /drone-delivery-nets-skynet/34809/> captured on Nov. 19, 2017) (Year: 2014).

George, Stumai "Rwanda Launches Drones to Deliver Medical Supplies", Oct. 17, 2016, Africa News Service. (Year: 2016).

Amazon's Vision for the Future: Delivery Drone Beehives in Every City, The Verge, dated Jun. 23, 2017, www.theverge.com/2017/06/23/15860668/amazon-drone-delivery-patent-city-centers, 7 pages.

Delivery Chutes Are Amazon's Latest Idea for Its Drone Delivery Services, DigitalTrends, dated Aug. 17, 2017, https:www.digitaltrends.com/cool-tech/amazon-drone-delivery-chute/, 4 pages.

U.S. Appl. No. 15/595,913, filed May 15, 2017, 62 pages.

PCT Application No. PCT/US18/45022, International Search Report and Written Opinion, dated Aug. 2, 2018, 18 pages.

\* cited by examiner

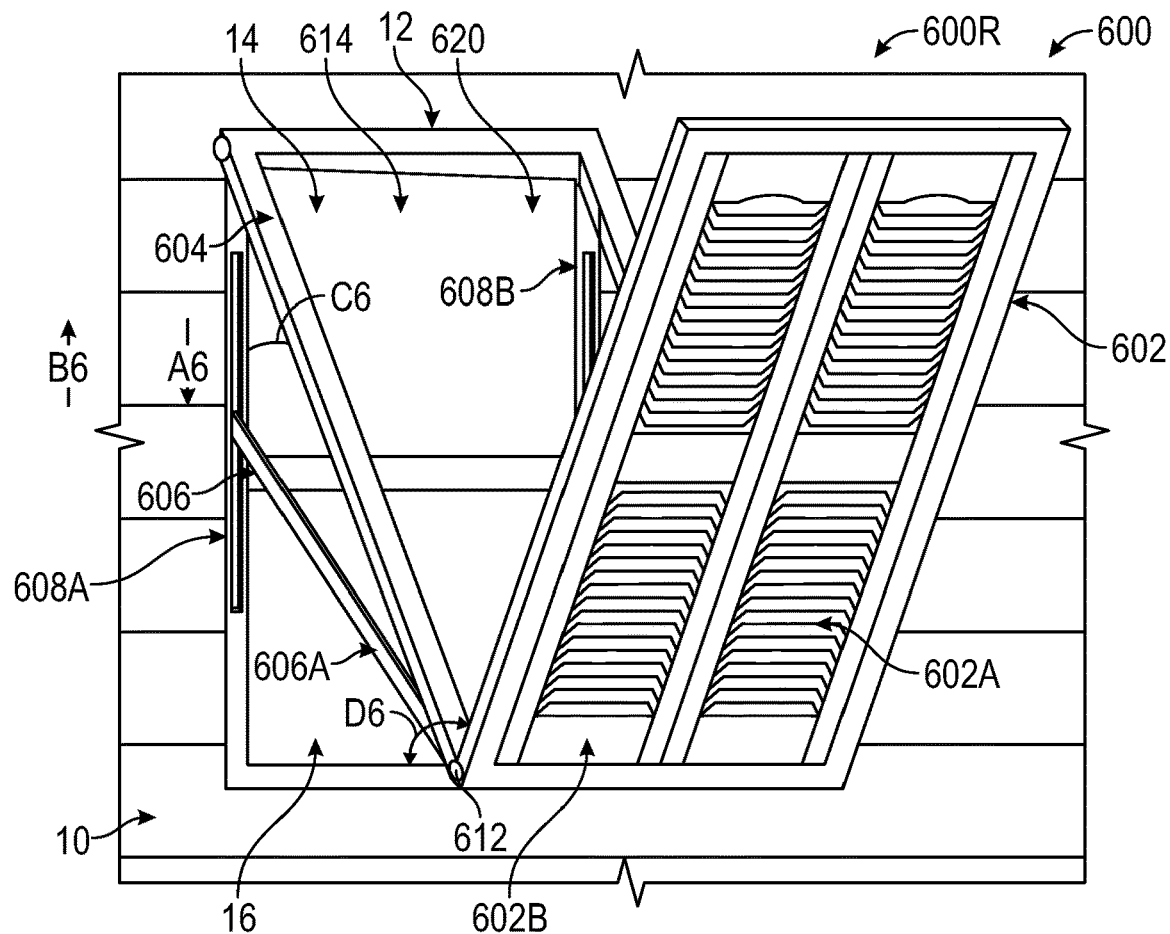
FIG. 6A
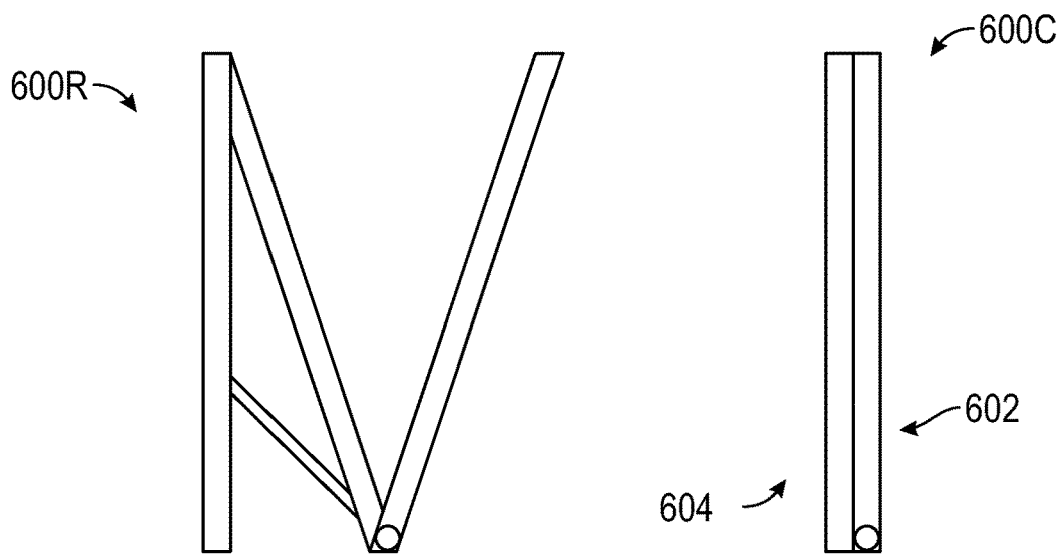
FIG. 6B  FIG. 6C

SYSTEMS AND METHODS FOR RECEIVING PACKAGES DELIVERED BY UNMANNED VEHICLES

CROSS REFERENCE TO RELATED APPLICATIONS

This application is a continuation of U.S. patent application Ser. No. 15/669,875, filed Aug. 4, 2017, and to be issued as U.S. Pat. No. 10,026,054 on Jul. 17, 2018, the entire disclosure of which is incorporated by reference herein in its entirety.

FIELD OF THE DISCLOSURE

The disclosure relates generally to the field of package receiving systems and methods. More specifically, the disclosure relates to systems and methods for receiving packages delivered by drones and other unmanned vehicles.

SUMMARY

The following presents a simplified summary of the disclosure in order to provide a basic understanding of some aspects of the disclosure. This summary is not an extensive overview of the disclosure. It is not intended to identify critical elements of the disclosure or to delineate the scope of the disclosure. Its sole purpose is to present some concepts of the disclosure in a simplified form as a prelude to the more detailed description that is presented elsewhere.

According to an embodiment, an apparatus for receiving a package delivered by an unmanned aerial vehicle comprises a collapsible package receiver adapted to be movably coupled to a building. The collapsible package receiver is configured to be placed from a collapsed position to a pop-out position to receive the package from the unmanned aerial vehicle. The apparatus has a memory associated with the package receiver which stores computer-readable instructions. A processor is configured to execute the instructions to: (a) determine a characteristic of the package delivered by the unmanned aerial vehicle to the package receiver; and (b) notify a user of the delivery of the package.

According to another embodiment, a method for receiving a package delivered by an unmanned aerial vehicle comprises the step of providing a pop-up package receiver. The method includes movably coupling the pop-up package receiver to a building, and placing the package receiver in a pop-out position. The method comprises raising the package receiver along the building to receive the package. The method includes lowering the package receiver after the package is received to retrieve the package from the package receiver.

According to yet another embodiment, a method for receiving a package delivered by an unmanned aerial vehicle comprises the step of providing a pop-up package receiver. The package receiver has a package receiving area and a sensor to determine at least one characteristic of the package. The package receiver includes a memory having computer-readable instructions stored thereon. The processor is configured to execute the instructions to: (a) wirelessly communicate with the unmanned aerial vehicle to authenticate the unmanned aerial vehicle; and (b) determine at least one characteristic of the package upon the delivery of the package to the package receiver. The method includes movably coupling the package receiver to a gutter of a building. The method comprises placing the package receiver from a collapsed position to an open position such that the package receiving area is accessible to the unmanned aerial vehicle. The method includes receiving the package in the package receiving area, and retrieving the package from the package receiving area. The method comprises placing the package receiver in the collapsed position upon retrieval of the package.

BRIEF DESCRIPTION OF THE SEVERAL VIEWS OF THE DRAWINGS

Illustrative embodiments of the present disclosure are described in detail below with reference to the attached drawing figures and wherein:

FIG. 6A is a perspective view illustrating another embodiment of the package receiving apparatus of FIG. 1;

FIG. 6B is a side view of the package receiving apparatus of FIG. 6A showing the apparatus in a package receiving position;

FIG. 6C is another side view of the package receiving apparatus of FIG. 6A showing the apparatus in a closed position;

DETAILED DESCRIPTION

Delivering packages from senders to recipients is an age old practice. Packages were initially delivered to recipients by package couriers on horses. Over time, as technology evolved, the couriers began using steamboats, locomotives, planes, road vehicles, etc., to deliver a package from a sender to a recipient remote from the sender. More recently, companies like Amazon, UPS, 7-Eleven, and others, are developing and investing in technologies that would allow unmanned vehicles (e.g., unmanned aerial vehicles or "drones", such as tricopters, quadcopters, octocopters, etc.) to deliver packages to the intended recipients. These technologies, once implemented on a large scale, may desirably reduce the costs, labor, and time it takes to deliver a package from one location to another. Delivering packages using unmanned aerial vehicles also presents a new host of challenges, however. For example, if an unmanned aerial vehicle flies down to the door of the abode of a recipient to drop off a package, the unmanned aerial vehicle may crash with a person who happens to be present in the area (or crash with an object), thereby injuring the person and/or damaging the aerial vehicle. Furthermore, dropping off packages outside the doors of the respective recipients' abodes may be undesirable because the dropped off packages (and the unmanned aerial vehicles themselves) may be susceptible to theft. It may be desirable to have in place systems that allow for: (a) unmanned aerial vehicles to drop off packages for recipients without coming proximate (e.g., within ten feet) of the ground; and/or (b) packages delivered by unmanned aerial vehicles to be securely stored until they are retrieved by the intended recipients. The present disclosure relates, at least in part, to such systems, and to methods of making and using these systems.

Figure 1:
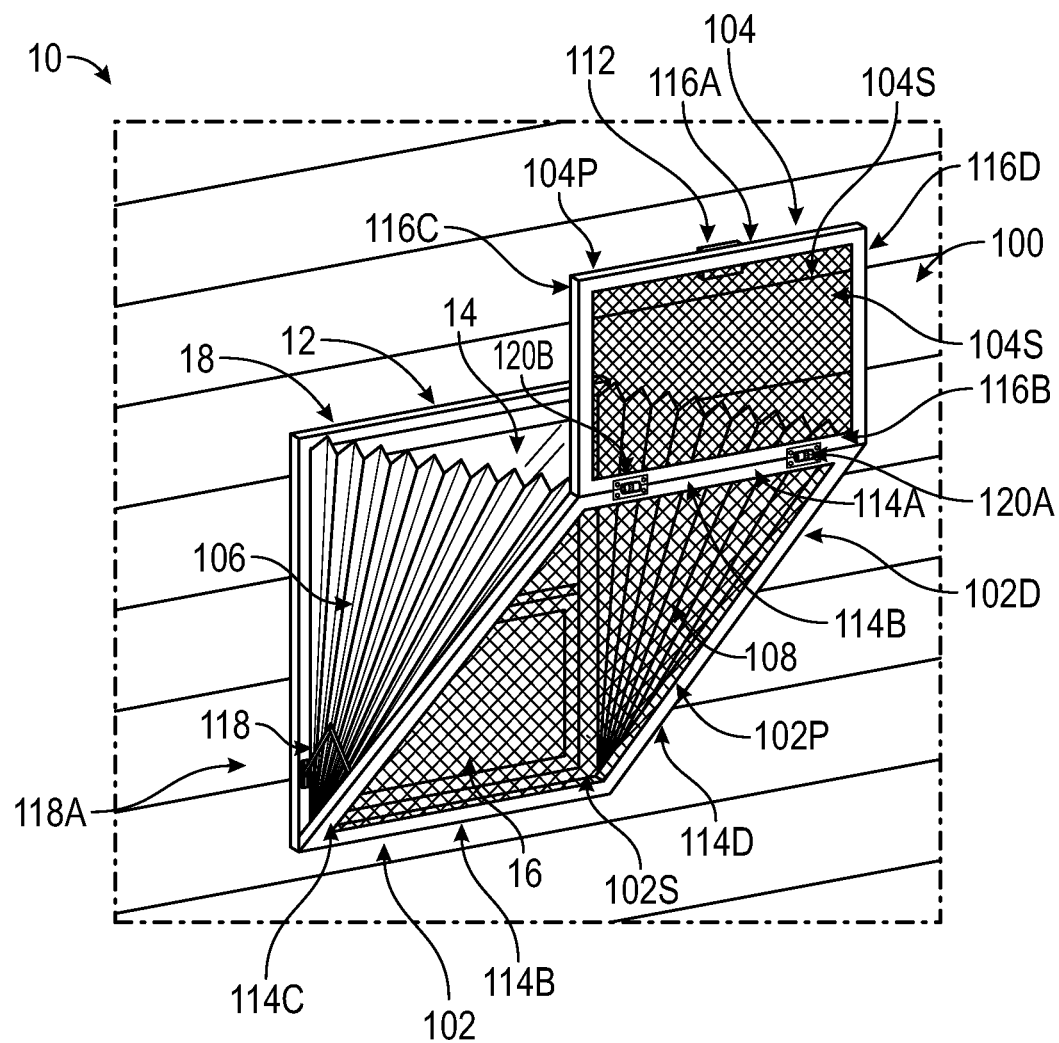
FIG. 1 is a perspective view of a package receiving apparatus, according to an embodiment.

FIG. 1 shows a package receiving apparatus 100 according to an example embodiment. The package receiving apparatus 100 may be adapted to receive and secure one or more packages delivered by unmanned aerial vehicle(s). The illustrated apparatus 100 is configured proximate a window 12 of a building 10. The building 10 may be an apartment building (such as a high-rise or other apartment building), a house, an office building, or other such structure, and may have more than one apparatus 100 operably coupled thereto (e.g., the building 10 may have a plurality of windows 12 and several windows 12 may each have an apparatus 100 associated therewith). The window 12 may be opened from within the building 10 to allow an intended recipient of a package to access the package receiving apparatus 100 and retrieve a package deposited therein.

The window 12 may, in embodiments, be a traditional pre-existing window and the package receiving apparatus 100 may subsequently be configured on the building 10 as a window accessory. Alternately, the window 12, together with the package receiving apparatus 100, may be sold together and installed on the building 10 at the same time. The size of apparatus 100, including the dimensions of the various components thereof, may be selected in line with the requirements of the particular application. In some embodiments, the window 12 is at least ten feet above the ground.

The window 12 may be a double hung window, as shown and known in the art, or another type of window now known or subsequently developed. In the illustrated embodiment, the window 12 includes an upper sash (or panel) 14, a lower sash (or panel) 16, and an outer casing 18. The window sashes 14 and 16 collectively have a height H (see FIG. 2). Specifically, the upper window sash 14 has a height H1 and the lower window sash 16 has a height H2. Height H1 may, but need not, be generally equal to height H2.

Each of the upper sash 14 and the lower sash 16 may be movable relative to the other sash. For example, as is known, the lower sash 16 may be slid upward such that at least a part thereof is adjacent (e.g., outwardly or inwardly adjacent) the upper sash 14. An intended recipient of a package (or another authorized user) inside the building 10 may access the package receiving apparatus 100 to retrieve a package deposited therein by an unmanned aerial vehicle upon opening the window 12. In embodiments, the window 12 (e.g., one or more sashes thereof) may be opened inwardly (i.e., by moving one or more sashes away from the apparatus 100) to provide access to a package deposited in the apparatus 100.

The apparatus 100, in an example embodiment, may comprise a primary panel 102, a secondary panel 104, end sections 106 and 108, and electronics 110 (discussed below, see FIG. 5) accommodated at least in part in a housing 112.

The primary panel 102 may include a perimeter portion 102P. The perimeter portion 102P may, in embodiments, be generally rectangular. For example, the perimeter portion 102P may include first and second horizontal members 114A and 114B that oppose and are parallel to each other, and first and second side members 114C and 114D that oppose and are parallel to each other. The first and second horizontal members 114A and 114B may extend generally horizontally, and the first and second side members 114C and 114D may extend generally vertically when the apparatus 100 is in a closed position as discussed herein.

The perimeter portion 102P may enclose a screen or mesh 102S, such as the biocide coated UV resistant Super Screen®, or another durable screen. The screen 102S, in embodiments, may be configured so as to not obstruct (or at least significantly obstruct) the view of a user looking through the window 12. That is, a user may be able to view the scene outside the window 12 through the sashes 14 and 16 and the screen 102S outwardly adjacent the window 12. In other embodiments, the screen 102S may be replaced with shutters, louvers, etc., that can be opened and closed to selectively obstruct the view through the window 12.

The secondary panel 104 may likewise include a generally rectangular perimeter portion 104P. The perimeter portion 104P may have two opposing horizontal members 116A and 116B that extend generally horizontally, and two opposing side members 116C and 116D that extend generally vertically when the apparatus 100 is in a closed position. Like the primary panel perimeter portion 102P, the secondary panel perimeter portion 104P may enclose a screen or mesh 104S. The screen 104S may but need not be made of the same materials as the screen 102S (e.g., metals, fiberglass, plastic, etc.).

Each end section 112 and 108 may comprise a foldable (e.g., a fan-foldable) curtain or other member, which may be folded and unfolded akin to traditional Japanese style curtains. The fan-foldable curtains 106 and 108 may comprise metals, plastics, or other desirable materials. The end section 106 may be attached to the first side member 114C of the primary panel 102 and to a vertical member of the window outer casing 18. The end section 108 may likewise be attached to the second side member 114D of the primary panel 102 and to the other vertical member of the window outer casing 18.

Figure 2:
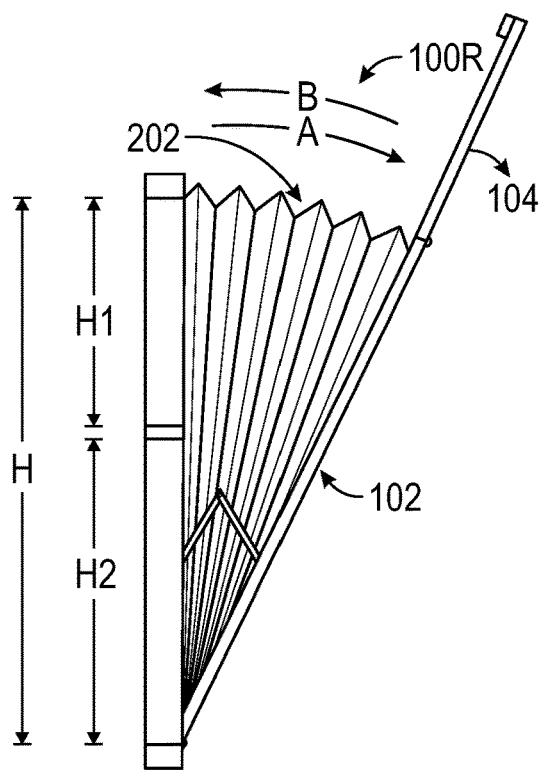
FIG. 2 is a side view of the package receiving apparatus of FIG. 1 and shows the apparatus in a package receiving position.
Figure 3:
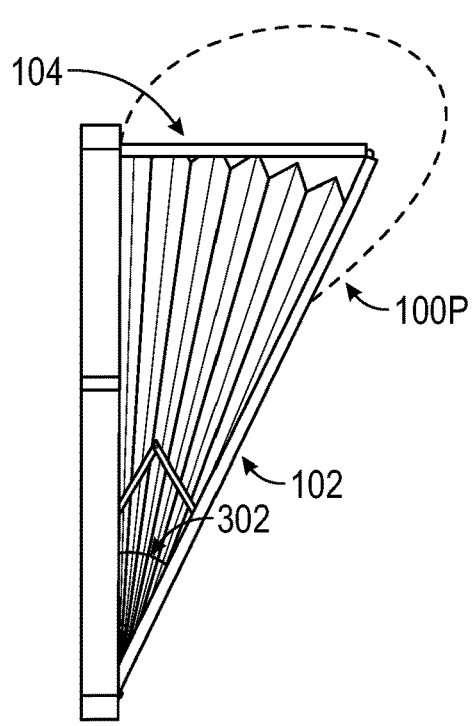
FIG. 3 is another side view of the package receiving apparatus of FIG. 1 and shows the apparatus in a package securing position.
Figure 4:
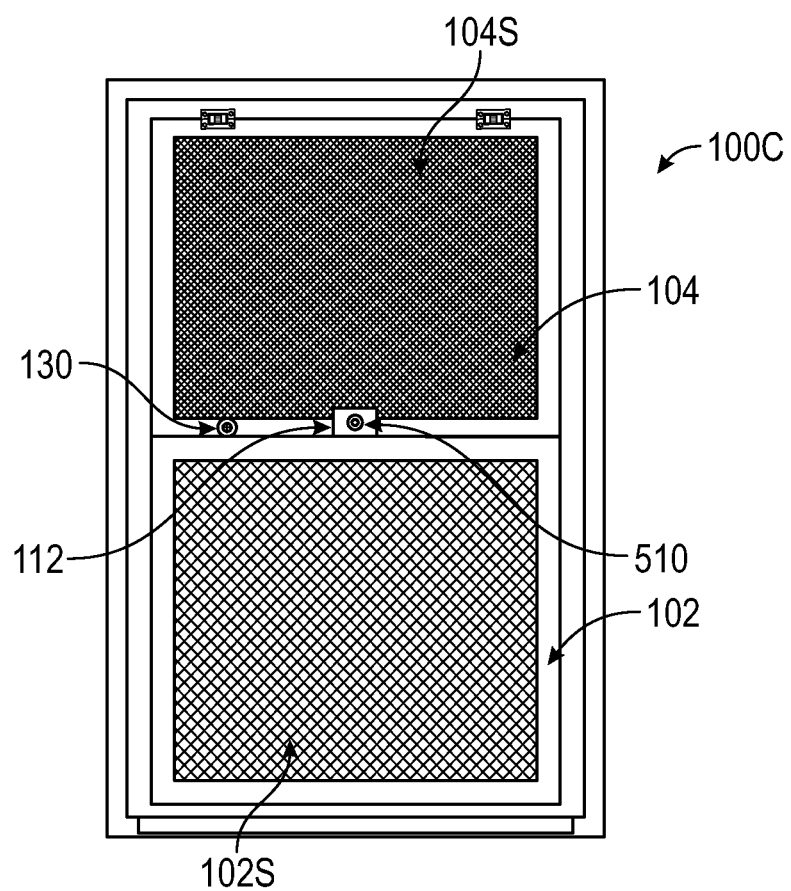
FIG. 4 is a front view of the package receiving apparatus of FIG. 1 and shows the apparatus in a closed position.

As discussed in more detail herein, the package receiving apparatus 100 may initially be in a closed position, may be opened to receive and secure a package deposited therein by an unmanned aerial vehicle, and may close again after the package has been retrieved by the intended recipient. More specifically, the apparatus 100 may: (a) initially be in a closed position, (b) be placed in a package receiving (or intermediate) position to receive a package when an unmanned aerial vehicle (e.g., a verified unmanned aerial vehicle as discussed herein) is proximate the apparatus 100, (c) be placed in a package securing position after the package has been deposited in the apparatus 100, and (d) return to the closed position after the intended recipient (or another authorized user) has retrieved the package from the apparatus 100. The repositioning of the apparatus 100 (e.g., from the closed position to the package receiving position, from the package receiving position to the package securing position, etc.) may, in embodiments, be automatic, and may be effectuated at least in part by the electronics 110. FIG. 2 shows the package receiving apparatus 100 in the package receiving position 100R. FIG. 3 shows the package receiving apparatus 100 in a package securing position 100P. And, FIG. 4 shows the package receiving apparatus 100 in a closed or initial position 100C.

As discussed herein, in the closed position 100C, the end sections 106 and 108 may be in a folded configuration so as to allow the primary panel 102 to be proximate (and in some embodiments, in contact with) the upper window sash 14 and the lower window sash 16. More specifically, in the closed position 100C, each of the primary panel 102 and the secondary panel 104 may extend generally vertically, and the secondary panel 104 may be outwardly adjacent the primary panel 102 (i.e., in the closed position 100C, the primary panel 102 may extend between the window 12 and the secondary panel 104). In the package securing position 100P, the end sections 106 and 108 may be in an extended (or unfolded) configuration, the secondary panel 104 may extend generally horizontally, and the primary panel 102 may extend at an angle 302 (see FIG. 3) with the vertical plane. In the package receiving position 100R, the end sections 106 and 108 may be in an extended (or unfolded) configuration such that the primary panel 102 extends at the angle 302, and the secondary panel 104 may extend generally parallel to the primary panel 102 (or may extend at another angle with respect to the vertical plane so as to allow the package(s) to be deposited in the apparatus 100). In the package receiving position 100R, thus, the end sections 106 and 108, together with the window 12 and the primary panel 102, may form a package receiving area 202 (see FIG. 2) for receiving a package deposited by an unmanned aerial vehicle. Once a package (or packages) has been deposited in the package receiving area 202, the secondary panel 104 may rotate and extend generally horizontally to abut the casing 18 as shown in FIG. 3; this may close the package receiving area 202 and secure the package in the package securing position 100P. When the intended recipient wishes to retrieve the package deposited in the package receiving area 202, he or she may open the window 12 to access the area 202 and pull the package inside the building 10 through the window 12. The apparatus 100 may then, upon user command or automatically, return to the closed position 100C (FIG. 4).

In more detail, the primary panel 102 may be rotatably coupled to the outer casing 18 via primary actuating members 118. For example, as shown in FIG. 1, a first primary actuating member 118A may extend between the first side member 114C of the perimeter portion 102P and the corresponding vertical member of the outer casing 18, and a second generally identical primary actuating member (not clearly visible in FIG. 1) may likewise extend between the second side member 114D of the perimeter portion 102P and the corresponding vertical member of the outer casing 18. The primary actuating members 118 may, in embodiments, be hinges for example, the operation of which may be controlled by the electronics (comprising a motor, for example). Alternately, telescoping members, gears, etc., may serve as the primary actuating members 118 to allow the primary panel 102 to selectively move with respect to the outer casing 18.

Each primary actuating member 118 may be adjacent one of the end sections 106 and 108. For example, as shown in FIG. 1, the first hinge 118A may be outwardly (or inwardly) adjacent the end section 106, and the second hinge (not clearly visible in FIG. 1) may be outwardly (or inwardly) adjacent the end section 108. The first hinge 118A and the second hinge may collectively allow the primary panel 102 to: (a) rotate in a direction A (FIG. 2) away from the casing 18 and extend at the angle 302 when the apparatus 100 moves from the closed position 100C to the package receiving position 100R; and (b) rotate in a direction B towards the casing 18 and extend generally vertically when the apparatus 100 moves from the package securing position 100P to the closed position 100C. In some embodiments, the hinges (e.g., each of the first hinge 118A and the second hinge) may be omitted, and the end sections 106 and 108 themselves may allow the primary panel 102 to be selectively moved relative to the window 12.

The secondary panel 104 may be rotatably coupled to the primary panel 102 via secondary actuating members 120. For example, the first horizontal member 114A of the primary panel 102 and the second horizontal member 116B of the secondary panel 104 may be coupled via gears 120A and 120B (or hinges or other means) to allow the secondary panel 104 to move relative to the primary panel 102. More specifically, the gears 120 may allow the secondary panel 104 to move relative to the primary panel 102 such that the secondary panel 104: (a) extends generally horizontally in the package securing position 100P (see FIG. 3); (b) extends generally vertically in the closed position 100C (see FIG. 4) such that the horizontal member 116A is below the horizontal member 116B; and (c) extends at the angle 302 (or another angle) in the package receiving position 100R (see FIG. 2).

In an embodiment, the height of the primary panel 102 may be generally equal to the height H (i.e., the height of the primary panel 102 may be generally equal to the collective height of the upper sash 14 and the lower sash 16). The height of the secondary panel 104 may be generally equal to the height H1 (i.e., the height of the secondary panel 104 may be generally equal to the height of the upper sash 14). Thus, in the closed position 100C: (a) the primary panel 102 may act as a traditional window screen and overlay each of the first sash 14 and the second sash 16; and (b) the secondary panel 104 may overlay the primary panel 102 (i.e., the secondary panel 104 may be outwardly adjacent the primary panel 102 which is outwardly adjacent the window 12) and may generally correspond to the upper sash 14. In embodiments, when in the closed position 100C, a user may be able to view the scene outside the window (i.e., the user may be able to see the scene outside the window 12 through each of the upper sash 14, the screen 102S, and the screen 104S; and, the user may be able to see the scene outside the window 12 through the lower sash 16 and the screen 102S).

Figure 5A:
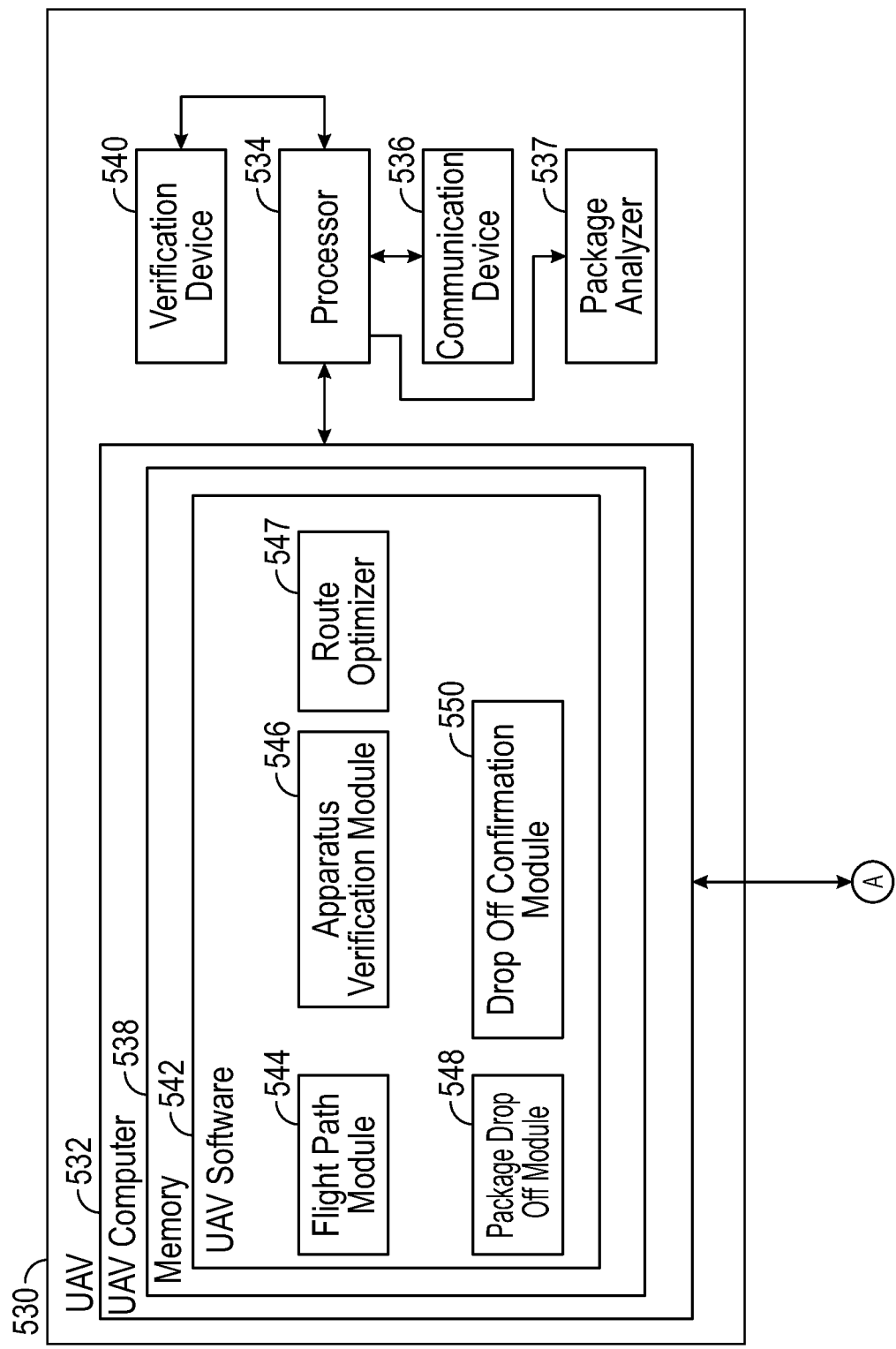
FIGS. 5A-5C schematically illustrate electronics associated with the package receiving apparatus of FIG. 1 and the communication thereof with a user device and an unmanned aerial vehicle.
Figure 5B:
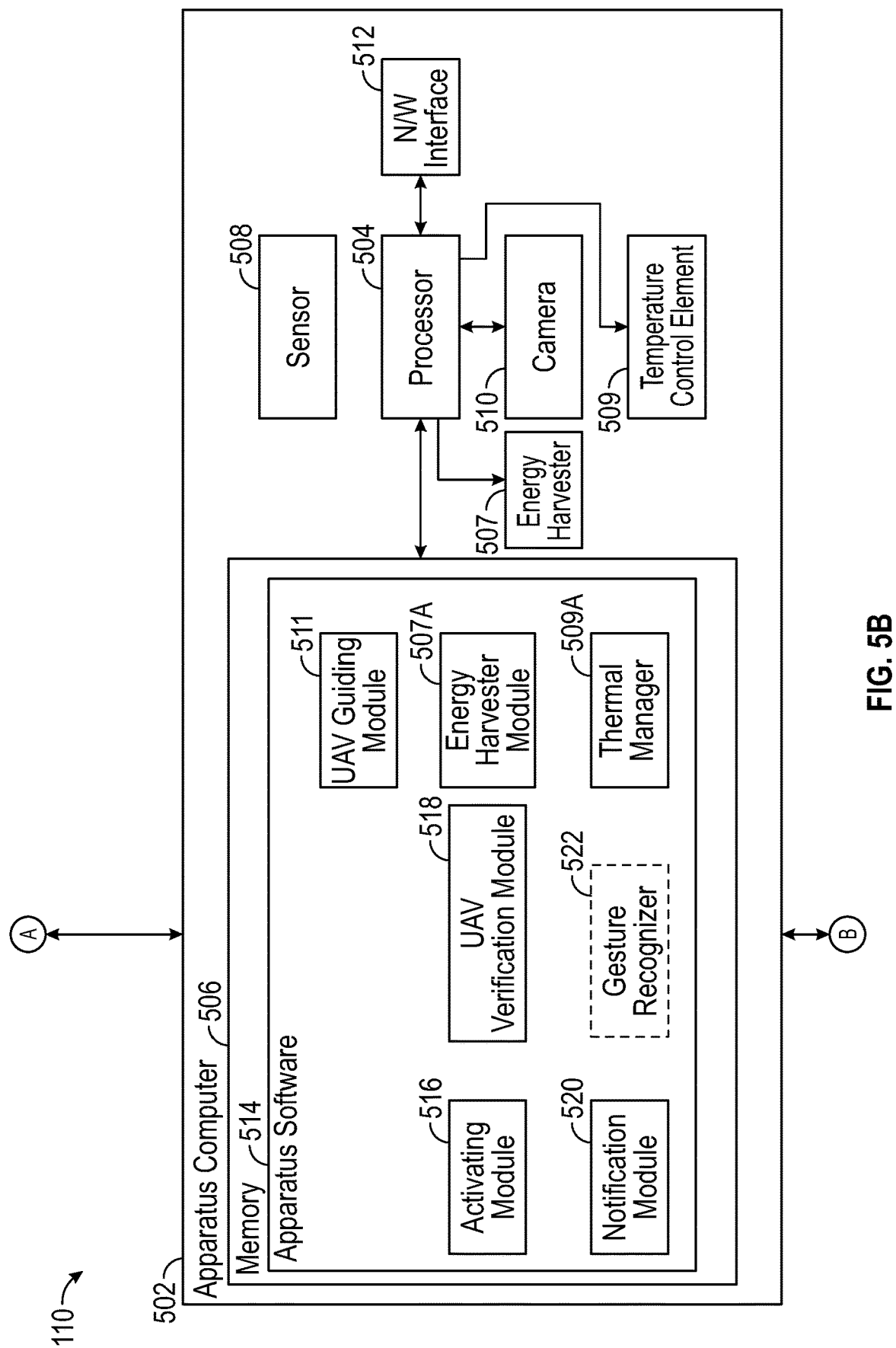

FIG. 5B shows the electronics 110 which may at least in part be housed in the housing 112. In embodiments, the housing 112 may be affixed to the secondary panel 104 as shown in FIG. 1. In other embodiments, the housing 112 may be affixed to the primary panel 102 or to the building 10 proximate the window 12. In other embodiments still, the housing 112 may include two or more housings each of which accommodate electronics to facilitate the workings of the apparatus 100 (e.g., the housing 112 may comprise a primary housing located in a central area and a secondary housing located proximate the apparatus 100).

The electronics 110 may, in embodiments, include an apparatus computer 502. The apparatus computer 502, or at least portions thereof, may be housed in the housing 112.

The example apparatus computer 502 includes a processor 504 communicatively coupled to a memory 506, an energy harvester 507, a sensor (or sensors) 508, a temperature control element 509, a camera 510, and a networking interface 512. Processor 504 represents one or more digital processors. In some example embodiments, the processor 504 may be configured through particularly configured hardware, such as an application specific integrated circuit (ASIC), field-programmable gate array (FPGA), etc., and/or through execution of software to perform functions in accordance with the disclosure herein. Network interface 512 may be implemented as one or both of a wired network interface and a wireless network (e.g., Wi-Fi, Internet, Bluetooth, etc.) interface, as is known in the art. Memory 506 represents one or more of volatile memory (e.g., RAM) and non-volatile memory (e.g., ROM, FLASH, magnetic media, optical media, etc.). Although shown within the apparatus computer 502, memory 506 may be, at least in part, implemented as network storage that is external to the apparatus 100 and accessed via network interface 512. The camera 510 may be a video camera or a still camera, and may comprise CMOS, CCD, and/or other imaging devices now known or subsequently developed.

Apparatus software 514 may be stored in a transitory or non-transitory portion of the memory 506. Apparatus software 514 includes machine readable instructions that are executed by processor 504 to perform the functionality of the apparatus 100 as described herein. In the illustrated example, the apparatus software 514 comprises an actuating module 516, a UAV verification (or authenticating) module 518, a notification module 520, an energy harvesting module 507A, a thermal manager 509A, and a UAV guiding module 511. In some embodiments, in addition to or in lieu of the UAV certification module 518, the apparatus software 514 may include a gesture recognizer 522. The apparatus software 514 is discussed in more detail below. In embodiments, only a part of the apparatus software 514 may be housed in the memory 506, whereas the remainder thereof may be housed elsewhere (e.g., on the cloud) or on another distributed network.

The apparatus computer 502 may be configured to communicate with an unmanned aerial vehicle 530 when the unmanned aerial vehicle 530 is proximate (e.g., within twenty or so feet of) the apparatus 100. The communication between the apparatus computer 502 and the unmanned aerial vehicle 530 may preferably be wireless communication. The unmanned aerial vehicle 530 is shown in FIG. 5A.

In more detail, the unmanned aerial vehicle (UAV) 530 may have a UAV computer 532. The UAV computer 532 may have a digital processor 534 in data communication with a communication device 536, a package analyzer 537, a memory 538, and optionally, a verification (or authentication) device 540. The communication device 536 may be any communication device that allows the UAV computer 532 to wirelessly communicate with other electronic devices over a network (such as a Bluetooth, Wi-Fi, or other network). As discussed herein, the verification device 540, where employed, may allow the UAV 530 to verify that the apparatus 100 in which the UAV 530 is depositing a package is associated with the intended recipient of the package. In embodiments, the verification device 540 may include a transmission device and a receiving device; for instance, the verification device 540 may include a laser (or other light, such as a visible) light emitter and receiver configured to receive energy reflected off the apparatus 100. Alternately or in addition, the verification device 540 may include a receiver configured to detect a unique visible or invisible signal (i.e., a signature) emitted by the apparatus 100 and verify the apparatus 100 using same.

In an embodiment, the UAV memory 538 may include UAV software 542 that enables the UAV 530 to travel to the apparatus 100, confirm that the apparatus 100 is associated with the intended recipient, and deposit a package therein. Specifically, the UAV software 542 may, in embodiments, include a flight path module 544, an apparatus verification module 546, a route optimizer 547, a package drop off module 548, and a drop off confirmation module 550, the functionality of each of which is described in more detail below.

Figure 5C:
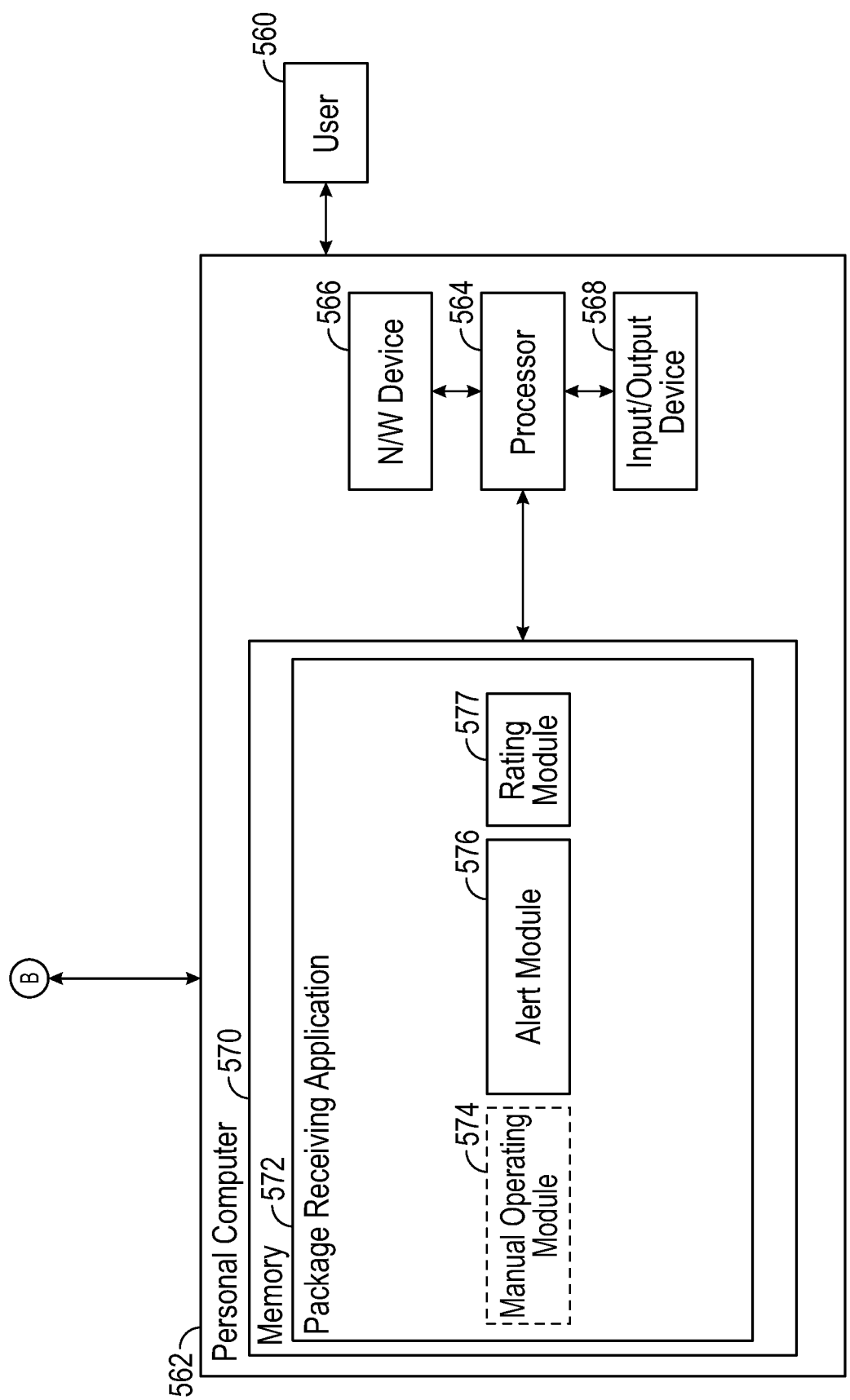

The apparatus 100, and specifically the computer 502 thereof, may also selectively communicate with a user 560 via a personal computer 562 of the user 560, shown in FIG. 5C. The user 560 may be the intended recipient of the package or another individual or group of individuals authorized by the intended recipient to collect the package from the apparatus 100 on the recipient's behalf. The personal computer 562 may be one or more of a laptop, desktop, mobile phone, tablet, or other computing device. As is known, the personal computer 562 may have a processor 564 in data communication with a networking device 566, an input/output device (such as a touchscreen display, keyboard, etc.) 568, and a memory 570. The user 560 may, in embodiments, download and install a package receiving application 572 into the memory 570 to interact with the apparatus 100. During the installation process, the user 560 may enter into the application 572 information about (e.g., identifying) the user 560, such as his or her name, address, preferred package receiving times, etc. In embodiments, each apparatus 100 may have a unique serial number (e.g., a unique alpha-numeric string) associated therewith that, for example, includes the size, model number, geographical coordinates, etc., of the apparatus 100; in these embodiments, the user 560 may, during the installation process, enter the unique serial number associated with the apparatus 100 into the package receiving application 572 to allow for the user 560 to be associated with the particular apparatus 100.

Example operation of the apparatus 100 will now be described with reference to FIGS. 1-5C. The apparatus 100 may initially be in the closed position 100C. Assume, for example, that an unmanned aerial vehicle (such as an autonomous, semi-autonomous, or other unmanned aerial vehicle) is to deliver a package to the recipient 560. The sender (or another, e.g., the owner or operator of the UAV 530) may enter into the UAV software 542 the geographical location of the apparatus 100 associated with the recipient 560. In some embodiments, the unique serial number associated with the particular apparatus 100 may be entered into the UAV software 542 and the software 542 may glean the geographical location of the apparatus 100 therefrom. The sender may also couple the package to the UAV 530 (e.g., the UAV 530 may have a package holding apparatus and the package may be secured therein or otherwise secured thereto). Package holding apparatuses for unmanned aerial vehicles, such as the UAV 530, are known in the art. Of course, the UAV 530 may also include a package holding apparatus that is subsequently developed.

The flight path module 544 may be configured to determine a flight path for the UAV 530 so that the UAV 530 can safely and efficiently travel to the apparatus 100. The flight path module 544 may, for example, employ publicly available geospatial data to determine a preferred flight path to the apparatus 100. Alternately, in embodiments, the sender (or drone operator) may manually enter a flight path in the flight path module 544. In other embodiments still, the sender may remotely and manually operate the UAV 530 to cause it to travel to the apparatus 100.

In embodiments, the UAV 530 may carry a package for the user 560 together with another package for another user (or additional packages for multiple different users). In these embodiments, the route optimizer 547 may compute the route that allows the UAV 530 to deliver the packages to the various apparatuses (e.g., apparatus 100 and other such apparatuses) efficiently based on governing criteria. In embodiments, the route optimizer 547 may use time as the governing criteria—that is, in embodiments, the route optimizer 547 may select for the UAV 530 the route which allows the UAV 530 to deliver all the packages in the shortest amount of time. In other embodiments, the route optimizer 547 may use fuel consumption as the governing criteria. In other embodiments, the route optimizer 547 may select its route based on the preferences indicated by the user 560 (and other users); e.g., if the user 560 prefers to receive packages before 5 pm and another user prefers to receive packages after 5 pm, the UAV 530 may deliver the package to the user 560 and then deliver the package to other user.

The package (e.g., package 814, see FIG. 8D) may, in embodiments, have identifying indicia placed thereon. The package identifying indicia may be, for example, an alphanumeric string, a conventional barcode, a QR code, etc., and the UAV 530 may include appropriate hardware and/or software to capture the package identifying indicia and evaluate the package and/or package contents based thereon. For example, in embodiments, the package identifying indicia may indicate that the package delivery is time-sensitive (e.g., the package contains an organ, a medication, a food that is best consumed hot, etc.). In these embodiments, the route optimizer 547 may take such into account and select a route that allows the UAV 530 to make the time-sensitive deliveries on time.

The package 814, and/or the UAV 530 itself, may contain identifying indicia that can be encoded to be readable by both humans and machines. The identifying content (e.g., the font(s), shape(s), etc. thereof) may utilize strategically positioned and shaped geometric figure patterns. The figure patterns and 'angles of perspective' may be used to derive position and vector angles between an observer and the UAV or package. Viewing techniques may be automated and utilize position and navigation algorithms to mathematically decoded package location, position, leveling, contents and vectored angle predictive trending. These techniques may be used to minimize undesirable shock and vibration during navigational approach and deployment of a package. The viewed pattern perspectives of known geometric patterns may be acquired and processed in real-time from a two-dimensional or a three-dimensional (i.e. stereoscopic) viewpoint perspective. These methods may utilize 3-D spatial mapping and marking techniques to maximize safe and balanced delivery of the package by the UAV 530.

To illustrate the workings of the apparatus 100, assume that the UAV 530 is to deliver a package to the apparatus 100. When the UAV 530 comes proximate (e.g., within twenty or so feet of) the apparatus 100, the apparatus verification module 546 of the UAV software 542 may ensure that the package being delivered is to be delivered to the particular apparatus 100. As noted, the building 10 may have more than one package receiving apparatus 100, and as such, there may be a plurality of apparatuses 100 in the vicinity. The apparatus verification module 546 may ensure that the package is delivered to the apparatus 100 associated with the intended recipient 560.

In some embodiments, the apparatus verification (or authentication) module 546 may employ the verification device 540 to verify that the package is being delivered to the intended apparatus 100. For example, in an embodiment, each apparatus 100 may have a unique visible (or other) marker(s), such as the marker 130 (FIG. 4), and the verification device 540 may read same to confirm that the package is delivered to the intended apparatus 100. The marker 130 may be passive or active. For instance, the marker 130 may be a two or three dimensional bar code and the verification device 540 may comprise a barcode scanner. Or, for example, the marker 130 may be an LED or other light source that blinks at a particular frequency and the verification device 540 may comprise a light sensor configured to read the light pattern to verify the particular apparatus 100 (the frequency of the blinking light may be such that the blinking may or may not be perceptible to the human eye). In some embodiments, when the UAV 530 is proximate the apparatus 100, the apparatus software 514, via the network interface 512, may transmit (e.g., over Bluetooth or another near-field network) to the communication device 536 of the UAV 530 a uniquely encoded signal which allows the apparatus verification module 546 to verify that the UAV 530 is interacting with the appropriate apparatus 100. Other verifications means (such as RFID, ultrasonic communications, etc.) may alternately or additionally be utilized. Thus, the artisan will understand from the disclosure herein that the UAV 530 may, in embodiments, ascertain information about each of the package and the apparatus 100 by reading and evaluating the respective indicators (e.g., barcodes, markers, alpha-numeric strings, etc.) placed thereon. In embodiments, where the authentication device 540 is unable to authenticate the UAV as a UAV authorized to deliver a package thereto, the apparatus 100 may remain in the closed position 100C to preclude the unauthorized package from being delivered to the apparatus 100.

In embodiments, the apparatus 100, and specifically the UAV identification module 518 thereof, may likewise verify that the UAV 530 is an unmanned vehicle authorized to deliver packages to the apparatus 100. Such may ensure that an unmanned aerial vehicle owned or operated by an unscrupulous person or group of people is unable to deliver a package (containing a bomb or Anthrax, for example) to the apparatus 100. Further, in embodiments, once the apparatus 100 has verified the UAV 530, a record of same may be stored at a remote location and/or in the memory 506; such may curtail the use of unmanned aerial vehicles to deliver firearms, drugs, etc., to the apparatus 100.

The UAV identification module 518 may identify the UAV 530 to ensure that the unmanned aerial vehicle is authorized to deliver a package to the apparatus 100 in one of any number of ways. In embodiments, the communication device 536 of the UAV 530 may communicate a uniquely encoded signal to the apparatus 502, and the signal, once received by the network interface 512, may be decoded by the UAV identification module 518 to approve the delivery of the package by the unmanned aerial vehicle 530.

In some embodiments, the apparatus software 514 may include a gesture recognizer 522, and the apparatus 100 may employ same to ensure that the unmanned aerial vehicle 530 is authorized to deliver a package to the apparatus 100. More specifically, the electronics 110 may include the camera 510 and the gesture recognizer 522 may include image processing capabilities; the UAV 530 may make a gesture (e.g., fly up three feet and down three feet three times, fly in a circle twice, etc.) and the gesture recognizer 522 may process and compare same to authorized UAV gestures to determine that the UAV 530 is authorized to deliver a package to the apparatus 100.

The camera(s) 510 may, in embodiments, be used to serve additional purposes. For example, in embodiments, the apparatus 100 may include more than one camera 510, at least one of which is configured to view the scene inside the package receiving area 202. The camera 510, together with image processing apparatus associated with the apparatus computer 502, may determine if the package is damaged, for instance; and, if so, the notification module 520 may notify the user 560 and/or the UAV computer 532 so that a record of the event could be created.

In embodiments, the UAV verification (or authentication) device 518 may utilize affirmative positive acknowledgement to the verification and authentication protocol methods and/or utilize intentionally misleading cues and triggers throughout the authentication process. For example, a visual lighted indication to move right could be an arrow shape pointing right. This right indicator may actually be intentionally counter-intuitive by protocol design to indicate that the UAV 530 should move left. Therefore, if the UAV 530 moves to the right as a result of this indicator cue, the authenticator 518 may ascertain that the UAV 530 is not authorized to deliver a package to the apparatus 100, and may therefore remain in the closed position 100C to preclude the unauthorized UAV from delivering a package to the apparatus 100. In these embodiments, authorized UAVs (e.g., UAV 530) may include logic to allow the UAV to respond appropriately to the acknowledgement requests transmitted by the apparatus 100 (e.g., in this example, the authorized UAV 530 may move left in response to the lighting of an arrow that appears to instruct the UAV 530 to move right). Verification and security systems and methods are further described in U.S. patent application Ser. No. 15/595,913, the entirety of which is incorporated herein by reference.

Once the apparatus verification module 546 of the UAV software 542 has verified the apparatus 100 and/or the UAV identification module 518 of the apparatus software 514 has verified the UAV 530, the actuating module 516 of the apparatus software 514 may cause the apparatus 100 to move from the closed position 100C (FIG. 4) to the package receiving position 100R (FIG. 2). Specifically, the actuating module 516 may be in data communication with the primary actuating members 118 and the secondary actuating members 120, and may cause same to selectively actuate to cause the apparatus 100 to move from the closed position 100C to the package receiving position 100R. For example, the actuating module 516 may cause the primary actuating members 118 (e.g., the hinges) to extend such that the primary panel 102, which in the closed position 100C extended generally vertically, now extends at the angle 302. The actuating module 516 may likewise cause the secondary actuating members 120 (e.g., the gears) to actuate such that the secondary panel 104, which in the closed position extended generally vertically, now extends at the angle 302 (or another angle) to create the package receiving area 202.

When the apparatus 100 is in the package receiving position 100R, the UAV guiding module 511 may guide the UAV 530 to the apparatus 100 so that the UAV 530 may deliver a package to the apparatus 100. For example, if there is a tree or other object (e.g., construction equipment that is temporarily placed in the path of the UAV 530 to the apparatus 100), the sensor 508 (e.g., a proximity sensor, a sonar device, a camera with image processing capabilities, etc.) may determine the presence of the obstacle and the UAV guiding module 511 may communicate same to the route optimizer 547 to enable the UAV 530 to safely deliver the package to the apparatus 100 around the obstacle. In some embodiments, e.g., if the apparatus 100 is full and/or is otherwise unable to receive a package (e.g., where the user 560 is not available to retrieve the package), the UAV guiding module 511 may communicate with the route optimizer 547 and direct the UAV 530 to redeliver the package at a more suitable time.

After the actuating module 516 has caused the apparatus 100 to move from the closed position 100C to the package receiving position 100R, the package drop off module 548 may cause the UAV to drop off the package(s) into the package receiving area 202 of the apparatus 100. For example, the package holding apparatus of the UAV 530 may, in response to a communication by the package drop off module 548, cause the package to be lowered (or otherwise dropped) into the package receiving area 202. In embodiments, the actuating module 516 of the apparatus 100 may communicate with the package drop off module 548 of the UAV 530 to apprise the UAV 530 that the apparatus 100 is ready to accept the package (e.g., once the apparatus 100 has moved from the closed position 100C to the package receiving position 100R, the actuating module 516 may communicate a drop off signal to the package drop off module 548 to apprise the UAV 530 that the apparatus 100 is ready to accept the package).

The sensor 508 may be a machine code reader (e.g., a barcode scanner), a weight scale, or other sensor that allows the apparatus computer 502 to determine at least one characteristic of the package dropped off (or being dropped off) into the package receiving area 202. For example, in some embodiments, the package being dropped off the by UAV 530 may have a barcode or other machine readable indicia and the sensor 508 may read same so as to allow the software 514 (e.g., the notification module 520) to determine the contents of (or other information about) the package. Alternately or additionally, the sensor 508 may determine the weight of the package and the notification module 520 may compare same to the expected weight of the package that is to be delivered to the apparatus 100. Such may provide further confidence that the appropriate package has been delivered to the apparatus 100. Alternately or additionally, in some embodiments, the package analyzer 537 of the UAV 530 may determine at least one characteristic of the package being delivered (e.g., upon reading a barcode or other indicia associated with the package) and communicate said at least one characteristic to the apparatus computer 502 so that the apparatus 100 may take appropriate action. Thus, the apparatus 100 may determine a characteristic of the package using the software 514 and the sensor 508 and/or a characteristic of the package may be gleaned by the UAV 530 and communicated to the apparatus computer 502. The apparatus 100 may employ this information as desirable.

For instance, in an embodiment, the apparatus 100 may include the temperature control element 509 (e.g., a heating element, a cooling element, a humidifier, etc.), and the thermal manager 509A of the apparatus software 514 may control the operation of same in line with the requirements of the particular application. For example, if the package analyzer 537 of the UAV 530 and/or the sensor 508 of the apparatus 100 determines that the package contains a hot food item (e.g., a pizza, a sandwich, etc.), a cold food item (e.g., ice cream, soda, etc.), or another item whose temperature must or should be controlled (e.g., an organ from an organ donor, medication, etc.), the thermal manager module 509A may automatically operate the temperature control element 509 to ensure that the apparatus 100 maintains the package at the desired temperature within the package receiving area 202. The artisan will appreciate that the temperature control element 509 may be disposed outside the electronics housing 112. In some embodiments, the screens (e.g., the screen 102S, the screen 104S, etc.) may be replaced with fabric or other material to allow for the temperature of the package receiving area to be better maintained.

After the package has been received in the package receiving area 202 of the apparatus 100, the actuating module 516 may actuate the secondary actuating members 120 to cause the secondary panel 104 to move relative to the primary panel 102 and extend generally horizontally to close off the package receiving area 202 in the package securing position 100P (FIG. 3). The package may thereby be secured within the apparatus 100, and specifically, the package receiving area 202 thereof. In some embodiments, a lock openable by the user 560 may be provided so that the package is locked within the area 202 and is generally inaccessible from outside the window 12.

The notification module 520 may notify the user 560 that a package has been received in the apparatus 100. For example, the notification module 520 may employ the network interface 512 to send the alert module 576 of the personal computer 562 a message outlining that the package has been received. The alert module 576 may, for example, ring, beep, vibrate, etc., to convey to the user 560 that a package has been delivered to the apparatus 100. Alternately, the notification module 520 may send a text message, e-mail, voicemail, etc., to the user 560 to apprise the user of the delivery of the package. In some embodiments, the alert module 576 may be configured to apprise multiple parties that a package has been delivered to the apparatus 100.

The user 560 may, in response to a notification by the notification module 520 (or otherwise), open the window 12 from inside the building 10 and retrieve the package through the window. The sensor 508 may indicate that the package has been removed from the package receiving area 202, which may in-turn cause the actuating module 516 to move the apparatus 100 from the package securing position 100P to the closed position 100C. That is, the actuating module 516 may cause the secondary actuating members 120 to cause the secondary panel 104 to rotate and extend generally vertically, and may cause the primary actuating members 118 to retract to cause the primary panel 102 to extend generally vertically and correspond to the window panels 14 and 16 as discussed above. Alternately, in embodiments, the package receiving application 572 of the personal computer 562 may have a manual operating module 574 and the user 560 may employ same to transmit a wireless signal to the apparatus 100; the actuating module 516, in response to this user command, may move the apparatus 100 from the package securing position 100P to the closed position 100C. The user 560, in embodiments, may likewise use the manual operating module 574 to place the apparatus 100 in the open position 110C and/or the package receiving position 100R.

While not required, in embodiments, the user may use the rating module 577 to rate the delivery by the UAV 530. The rating module 577 may further allow the user 560 to provide comments to the UAV operator. For example, the user 560 may use the personal computer 562 and the ratings module 577 to apprise the sender that the package delivery was as expected, is in need of improvement, etc.

Power to the apparatus 100, e.g., to the apparatus computer 502 and its associated components (such as the actuators, thermal control elements 509, sensors 508, camera(s) 510, etc.) may be provided in one or more of any number of ways. In an embodiment, standard AC power from the building 10 may be used to the power the apparatus 100. In some embodiments, a rechargeable or other battery may be used to power the apparatus 100. Alternately or in addition, the energy harvester 507 (e.g., solar cells, wind energy devices, etc.) may be controlled by the energy harvesting module 507A and harvest energy to provide power to the apparatus 100. It is envisioned that the energy harvester 507, together with the energy harvesting module 507A, may in embodiments also provide power to the building 10.

Thus, as has been described, the apparatus 100 may, among other things: (a) act as a window screen in the closed position 100C; (b) receive a package from an unmanned aerial vehicle (e.g., the UAV 530) in the package receiving position 100R after verifying that the unmanned aerial vehicle is authorized to deliver a package thereto; (c) secure the package in the package securing position 100P after the package has been deposited by the UAV 530 in the package receiving area 202; (d) determine at least one characteristic of the package; (e) notify the user that a package is ready to be picked up by the user; and/or (f) return to the closed position 100C after the package has been retrieved by the user.

While the structure for the package receiving apparatus 100 is disclosed in detail above, the artisan will appreciate that this structure is not intended to be independently limiting and that the package receiving apparatus 100 may take on other shapes and/or different forms. For example, in an embodiment, a window awning may serve as the package receiving apparatus and may automatically be lowered (e.g., by the electronics 110) at the window connection point to receive a package delivered by an unmanned aerial vehicle.

In embodiments, the window 12 may be, for example, a storm window. Of course, the apparatus 100 (and the other package receiving apparatuses discussed herein) may be used in conjunction with storm doors, garage doors, window awnings, etc.

Focus is directed now to FIGS. 6A-6C, which show an alternate embodiment 600 of the package receiving apparatus 100. The package receiving apparatus 600 may be similar to the package receiving apparatus 100, except as specifically noted and/or shown, or as would be inherent. Further, those skilled in the art will appreciate that the apparatus 100 (and thus the apparatus 600) may be modified in various ways, such as through incorporating all or part of any of the various described embodiments, for example. For uniformity and brevity, corresponding reference numbers may be used to indicate corresponding parts, though with any noted deviations.

The package receiving apparatus 600 may, akin to the apparatus 100, be configured outside the window 12. The example apparatus 600 has a primary panel 602, an intermediate portion 604, and two opposing slidable members 606 (e.g., slidable member 606A and an opposing slidable member). Each slidable member 606 may be configured to slide within a channel or groove 608 (e.g., the slidable member 606A may be configured to slide within the channel 608A and the other slidable member may be configured to slide within the channel 608B).

The primary panel 602, in an embodiment, may comprise two or more sections (e.g., sections 602A and 602B). The sections 602A and 602B may be selectively opened and closed to allow a user to view the scene outside the window 12.

The primary panel 602 may be rotatably coupled to the intermediate portion 604 via rotatable members 612. The rotatable members 612 may, for example, rotate in a counterclockwise to cause the primary panel 602 to move towards the intermediate portion 604, and rotate in a clockwise direction to cause the primary panel 602 to move away from the intermediate portion 604. The apparatus 600 may comprise electronics, such as the electronics 110 discussed above for apparatus 100, to allow the apparatus 600 to receive a package and notify the user of same.

FIG. 6C shows the apparatus 600 in a closed position 600C. As can be appreciated, to place the apparatus 600 in the closed position 600C, the: (a) slidable members 606 may slide in the direction B6 to cause the intermediate portion 604 to extend generally vertically proximate and adjacent the window 12; and (b) the rotatable members 612 may rotate in the counter clockwise direction to cause the primary panel 602 to also extend generally vertically and essentially act as a shade for the window 12. When an unmanned aerial vehicle, such as the unmanned aerial vehicle 530 comes proximate the apparatus 600, the electronics thereof may communicate with the UAV 530 as discussed above for the apparatus 100 and cause the apparatus 600 to move from the closed position 600C (FIG. 6C) to the package receiving position 600R (FIGS. 6A and 6B). Specifically, once the apparatus 600 confirms that the UAV 530 is authorized to deposit a package in a package receiving area 614 thereof, the: (a) slidable members 606 may slide in the direction B6 to cause the intermediate portion to extend at an angle C6 with the vertical; and (b) rotatable members 612 may rotate in the clockwise direction to cause the primary panel 602 to extend at an angle D6 with the vertical. Such may provide the UAV 530 access to the package receiving area 614, and the UAV 530 may deposit a package therein. The notification module of the apparatus 600, as discussed above for the apparatus 100, may notify the user that a package has been deposited in the apparatus 600 and may be retrieved therefrom. The user, upon receiving the notification, may open the window 12 from inside the building 10 and retrieve the package. Once the package has been removed, the apparatus 600 may automatically (or in some embodiments, based on user command) shift from the package receiving position 600R to the closed position 600C. As discussed above for the apparatus 100, the apparatus 600 may include one or more sensors that determine at least one characteristic of the package deposited in the apparatus 600.

Figure 7A:
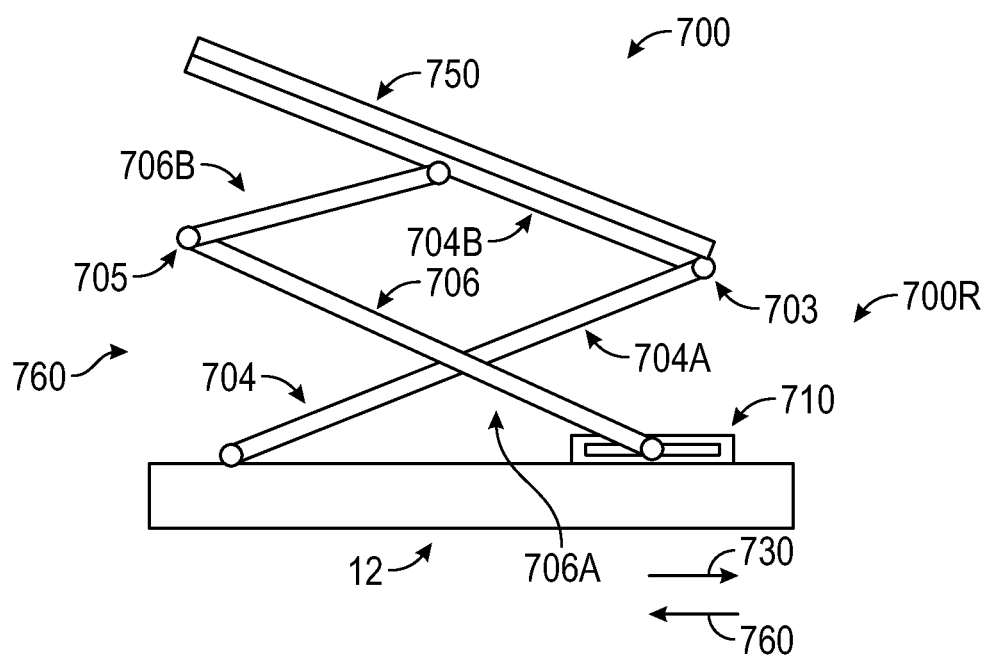
FIG. 7A is a top view illustrating another embodiment of the package receiving apparatus of FIG. 1 and shows the apparatus in a package receiving position.
Figure 7B:
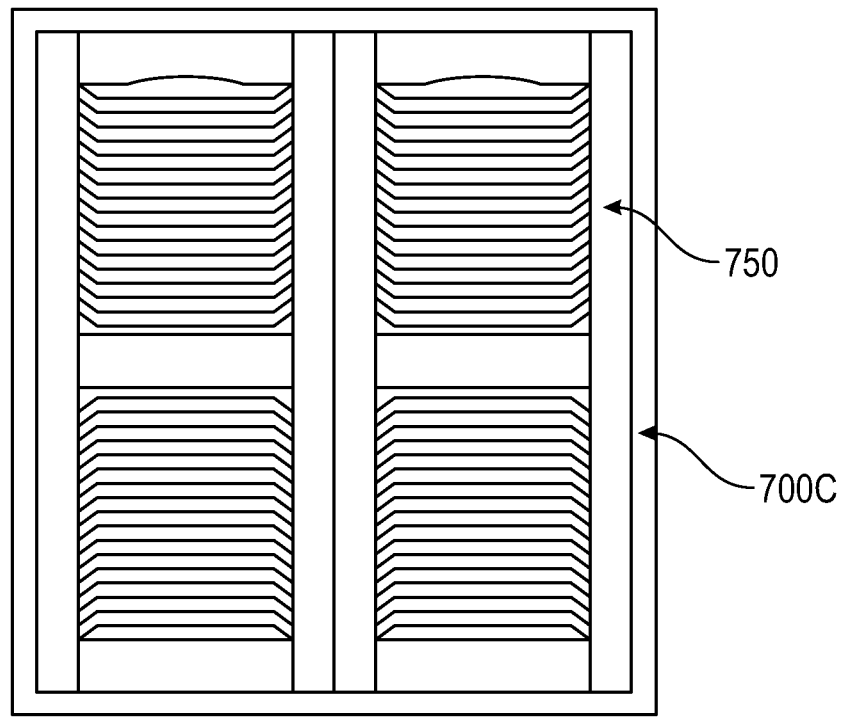
FIG. 7B is a side view of the package receiving apparatus of FIG. 7A and shows the apparatus of FIG. 7A in a closed position.

FIGS. 7A-7B show another alternate embodiment 700 of the package receiving apparatus 100. The package receiving apparatus 700 may be similar to the package receiving apparatus 100, except as specifically noted and/or shown, or as would be inherent. Further, those skilled in the art will appreciate that the apparatus 100 (and thus the apparatus 700) may be modified in various ways, such as through incorporating all or part of any of the various described embodiments, for example. For uniformity and brevity, corresponding reference numbers may be used to indicate corresponding parts, though with any noted deviations.

The apparatus 700, akin to the apparatuses 100 and 600 discussed above, may be configured outside a window (e.g., window 12). Further, like the apparatus 100 (and apparatus 600) discussed above, the apparatus 700 may include electronics (e.g., electronics 110, housed in a housing, for example) that: (a) cause the apparatus 700 to move from a closed position 700C (FIG. 7B) to a package receiving position 700R (FIG. 7A) to receive a package when an unmanned aerial vehicle (e.g., UAV 530) is proximate the apparatus 700; (b) cause the apparatus 700 to move from the package receiving position 700R back to the closed position 700C when the package has been retrieved from the apparatus 700 by the user. As discussed above for other embodiments, the user 560 may retrieve the package from inside the building upon opening the window 12.

In more detail, the apparatus 700 may comprise a first linkage 704 having a first bar 704A and a second bar 704B that is rotatably coupled to the first bar 704A at a joint 703. The apparatus 700 may further include a second linkage 706 having a first bar 706A and a second bar 706B that is rotatably coupled to the first bar 706A at a joint 705. The joints 703, 705 may be hinges or other rotatable members whose movement may be controlled by the electronics (e.g., electronics 110) associated with the apparatus 700.

The first bar 706A of the second linkage 706 may be slidably coupled to a limiter 710 having stops at either side. The limiter 710 may in-turn be coupled to the window 12. The first bar 706A of the second linkage 706 may be configured to slide within the limiter until it abuts one of the ends thereof. The apparatus 700 may include shutters, louvers, etc. (e.g., shutters 750, see FIG. 7B) that may be selectively opened and closed as desired to view or obstruct the scene outside the window 12.

The apparatus 700 may traditionally be in the closed position 700C. When the UAV 530 comes proximate the apparatus 700, the electronics thereof may confirm that the UAV 530 is authorized to deliver a package to the apparatus 700 (as discussed above for other embodiments). Once the authorization is complete, the apparatus 700 may automatically move from the closed position 700C (FIG. 7B) to the package receiving position 700R (FIG. 7A). Specifically, the second linkage first bar 706A may slide in the direction 740 within the limiter 710 and the second bar 706B of the second linkage 706 may rotate in a counter clockwise direction to create a package receiving area 760 to receive the package. Once the package is deposited in the apparatus 700, the electronics associated with the apparatus 700 may notify the user 560 of same. The user 560 may retrieve the package upon opening the window, and thereafter, the apparatus 700 may automatically move from the package receiving position 100R to the closed position 100C. As can be appreciated, in this configuration, the apparatus 700 may serve as traditional shutters on the window 12.

Focus is directed now to FIGS. 8A-8E to illustrate yet another embodiment of the package receiving apparatus, referred to herein as a pop-up (or collapsible) package receiving apparatus 800. The package receiving apparatus 800 may be similar to the package receiving apparatus 100, except as specifically noted and/or shown, or as would be inherent. Further, those skilled in the art will appreciate that the apparatus 100 (and thus the apparatus 800) may be modified in various ways, such as through incorporating all or part of any of the various described embodiments, for example. For uniformity and brevity, corresponding reference numbers may be used to indicate corresponding parts, though with any noted deviations.

Figure 8B:
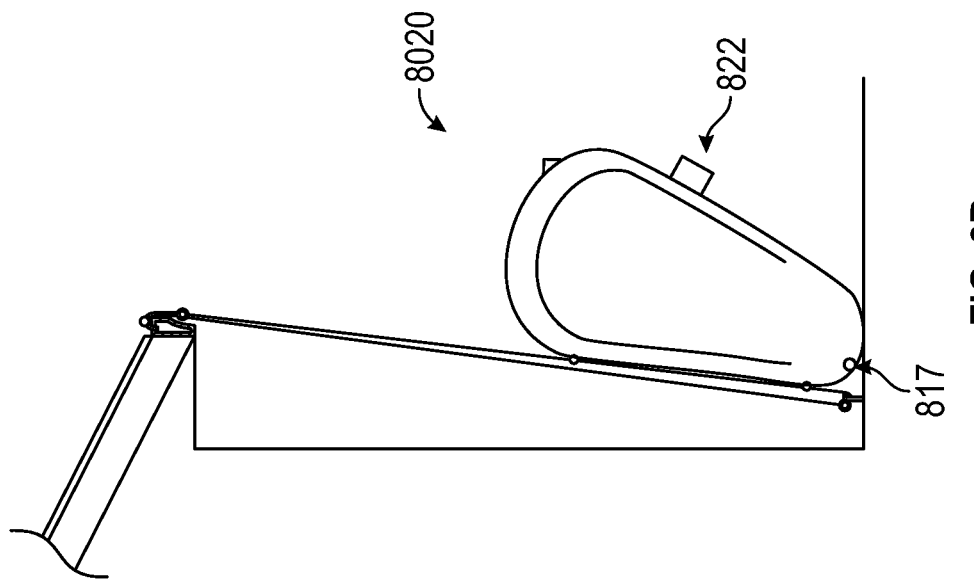
FIG. 8B is another side view of the apparatus of FIG. 8A and shows the apparatus in an open position.
Figure 8A:
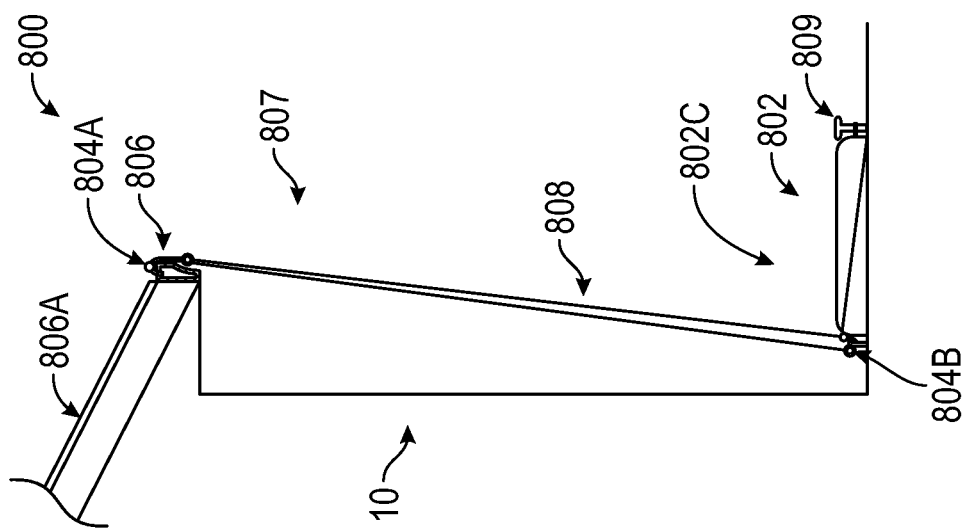
FIG. 8A is a side view of another embodiment of the package receiving apparatus of FIG. 1 and shows the apparatus in a collapsed position.

The collapsible package receiving apparatus 800 may include a pop-up package receiver 802, which is shown in a collapsed position 802C in FIG. 8A and in an open or pop-out position 802O in FIG. 8B. The pop-up package receiver 802 may comprise polyester, other fabrics, or other desirable materials that allow the package receiver 802 to be collapsed during periods of non-use.

Unlike the other embodiments discussed above, the package receiving apparatus 800 need not necessarily be configured outside a window; rather, the package receiving apparatus 800 may be movably coupled to the building 10, e.g., to a gutter 806A or other such structure present on the roof of (or elsewhere on) a residential or other building 12. More specifically, in an embodiment, the package receiver 802 may include one or more supporting (or suspending) members, such as hooks 804A and 804B for example, to allow the receiver 802 to be movably coupled to the gutter 806A via a rope or string 808 (akin to a flag, for instance). In some embodiments, a pulley 806 or other means may be provided to allow a user to conveniently raise the package receiver 802 when the delivery of a package thereto is expected. The hooks 804A, 804B, together with the rope 808 and the pulley 806 may collectively be referred to herein as the elevating means 807. Of course, other means may alternately or additionally be provided to allow a user to elevate the package receiver 802 when desired so that the UAV 530 can feasibly deliver a package thereto.

It is envisioned that the package receiving apparatus 800, and specifically, the package receiver 802 thereof, will generally remain in its collapsed position 802C for storage, and will be opened and raised to retrieve a package only on days (or times) on which the delivery of a package or packages is expected. Such functionality may allow the package receiving apparatus 800 to have a reduced form factor when not in use, which may be preferable as the collapsed package receiver 802 may not substantially detract from the appearance of the building 10. In embodiments, when not in use, the package receiver 802 may, in its collapsed position 802C, be removably coupled to the ground, such as via stake 809, a weight, a hook, et cetera. Such may ensure that the package receiver 802 remains in place despite strong winds and other such elements encountered thereby.

As shown in FIG. 8B, the user (e.g., the user 560, see FIG. 5) may place the pop-up package receiver 802 in its open position 802O when the delivery of a package to the receiver 802 is expected. The user may then raise the package receiver 802 via the elevating means 807 and place it in a package receiving position 802R adjacent or otherwise proximate the gutter 806A (see FIG. 8C) so that a UAV (e.g., UAV 530, see FIGS. 5, 8D) may deliver a package to the receiver 802.

Figure 8D:
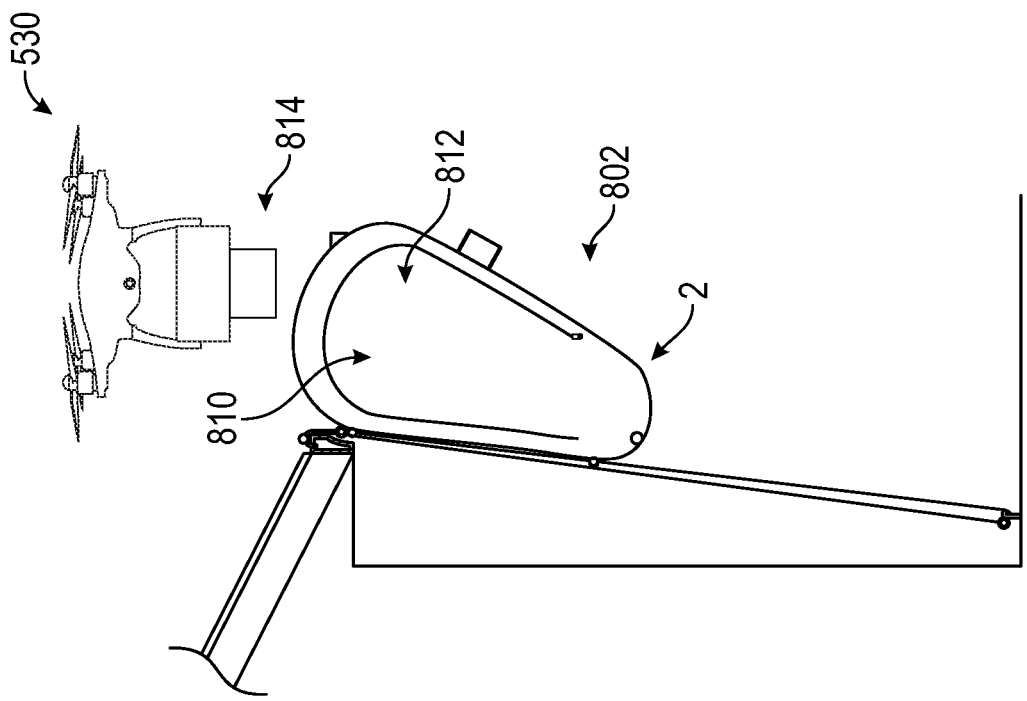
FIG. 8D is yet another side view of the apparatus of FIG. 8A and shows the apparatus receiving a package from an unmanned aerial vehicle.

In embodiments, the receiver 802 may include a package receiving area 810, e.g., a cavity 812 defined by the receiver walls that can be accessed from a top side of the receiver 802 to allow the UAV 530 to deposit a package 814 therein (FIG. 8D). Once the package has been delivered, the user 560 may be notified of same as discussed above for the other embodiments; for example, the user 560 may be notified of the delivery of the package 814 via electronics (e.g., electronics 110) that communicate with the mobile device (e.g., with the mobile application 572, see FIG. 5) of the user 560. When the user 560 wishes to retrieve the package 814, he may use the elevating means 807 to lower the package receiver 802 such that it is proximate (e.g., in contact with) the ground surface. The user 560 may then extract the package 814 from the collapsible receiver 802. For instance, the receiver 802 may include a zipper Z (FIG. 8D) or other means (e.g., buttons, latches, etc.) to allow the user 560 to open a section 815 of the receiver 802 to access the cavity 812 from a side of the package receiver 802 to retrieve the package 814 in the cavity 812. The user 560 may then conveniently fold the receiver 802 (i.e., place it in the closed or collapsed position 802C, FIG. 8A) for storage.

In an embodiment, the pop-up package receiver 802 comprise, for example, an off the shelf pop-up pod changing room, such as a GigaTent or other pod changing room, with minor modifications. For example, in embodiments, one or more holes 817 (see FIG. 8B) may be formed at the bottom of (or elsewhere on) the package receiver 802 to preclude rain water and other such elements from undesirably collecting in the package receiving area 810.

Figure 9:
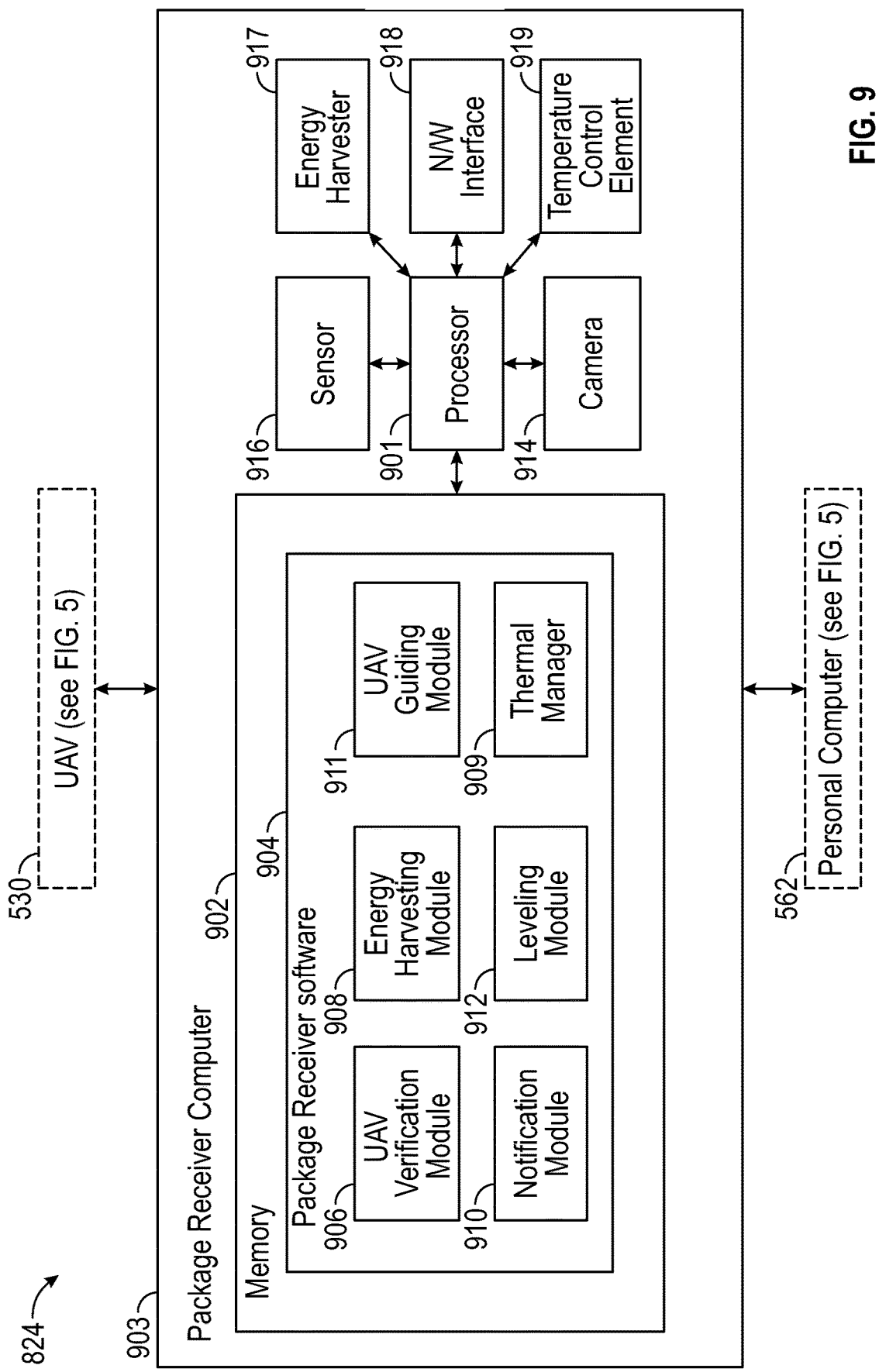
FIG. 9 schematically illustrates electronics associated with the package receiving apparatus of FIGS. 8A-8E and the communication thereof with other devices.

The package receiver 802 may include many or all of the electronics 110 discussed above for apparatus 100. For example, the package receiver 802 may have a housing (e.g., a complete or partial enclosure) 822 retaining electronics 824 shown in more detail in FIG. 9. The electronics 824 may include an apparatus computer 903, which may allow the package receiving apparatus 800 to selectively communicate with the UAV 530 and the personal computer 562 discussed above in more detail with respect to FIG. 5.

The package receiver computer 903, or at least portions thereof, may be housed in the housing 822. The example package receiver 903 includes a processor 901 communicatively coupled to a memory 902, a sensor or sensors 916, an energy harvester 917, a camera 914, a networking interface 918, and a temperature control element 919. Processor 901 represents one or more digital processors. In some example embodiments, the processor 901 may be configured through particularly configured hardware, such as an application specific integrated circuit (ASIC), field-programmable gate array (FPGA), etc., and/or through execution of software to perform functions in accordance with the disclosure herein. Network interface 918 may be implemented as one or both of a wired network interface and a wireless network (e.g., Wi-Fi, Internet, Bluetooth, etc.) interface, as is known in the art. Memory 902 represents one or more of volatile memory (e.g., RAM) and non-volatile memory (e.g., ROM, FLASH, magnetic media, optical media, etc.). Although shown within the apparatus computer 903, memory 902 may be, at least in part, implemented as network storage that is external to the apparatus 800 and accessed via network interface 918. The camera 914 may be a video camera or a still camera, and may comprise CMOS, CCD, and/or other imaging devices now known or subsequently developed.

Package receiver software 904 may be stored in a transitory or non-transitory portion of the memory 902. Apparatus software 904 includes machine readable instructions that are executed by processor 901 to perform the functionality of the apparatus 800 as described herein. In embodiments, only a part of the apparatus software 904 may be housed in the memory 902, whereas the remainder thereof may be housed elsewhere (e.g., on the cloud) or on another distributed network. In the illustrated example, the apparatus software 904 comprises a UAV verification module 906, an energy harvesting module 908, a thermal manager module 909, a notification module 910, a UAV guiding module 911, an auto-leveling (or leveling) module 912.

The package receiver computer 502 may be configured to communicate with an unmanned aerial vehicle 530, and specifically the UAV computer 532 thereof (see FIG. 5) when the unmanned aerial vehicle 530 is proximate (e.g., within twenty or so feet of) the collapsible package receiver 802. The communication between the package receiver computer 903 and the unmanned aerial vehicle 530 may preferably be wireless communication. The package receiver computer 903 may also selectively communicate with the user 560 via the personal computer 562 of the user 560. As discussed for apparatus 100, the user 560 may, in embodiments, download and install the package receiving application 572 into the memory 570 to interact with the apparatus 800.

Figure 8C:
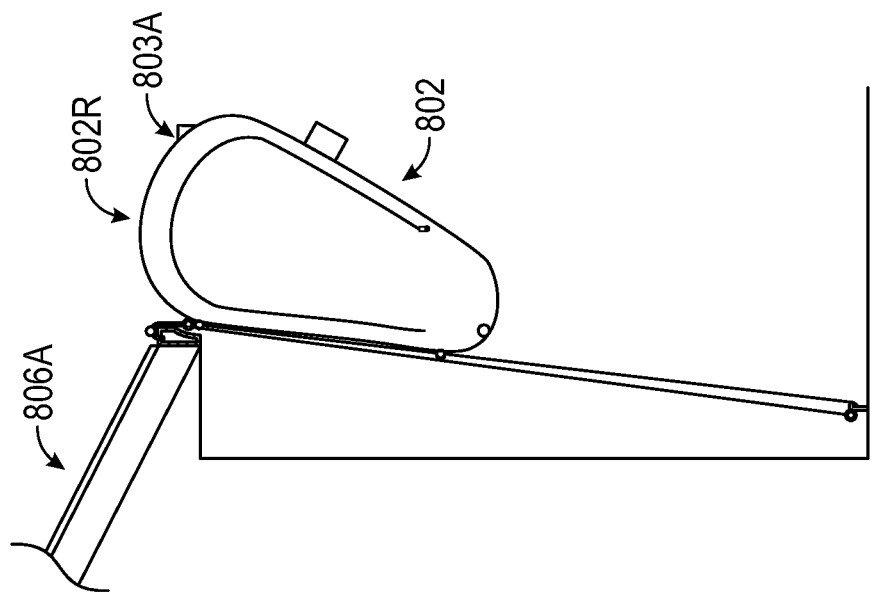
FIG. 8C is another side view of the apparatus of FIG. 8A and shows the apparatus in a package receiving position.

Example operation of the apparatus 800 will now be described with reference to FIGS. 8A-E and 9. The package receiver 802 may initially be in the closed position 802C (FIG. 8A). Assume, for example, that the user 560 orders (e.g., online or in-person) an item from the store and that the store apprises the user 560 that the item will be delivered to the user 560 two days thereafter. On the day of the delivery, the user 560 may place the package receiver 802 from the closed position 802C (FIG. 8A) to the open position 802O (FIG. 8B). For instance, the user 560 may decouple the stake 809 from the ground and pop-out the apparatus 802 (see FIG. 8B). The user 560 may then use the elevating means 807 to elevate the package receiver 802 and place it in the package receiving position 802R as shown in FIG. 8C (e.g., the user 560 may place the receiver 802 in the package receiving position 802R when he leaves his house for work).

In time, the unmanned aerial vehicle (such as an autonomous, semi-autonomous, or other unmanned aerial vehicle) may come proximate the apparatus 800 to deliver the package 814 to the package receiver 802. For example, and as discussed above for apparatus 100, the sender (or another, e.g., the owner or operator of the UAV 530) may enter into the UAV software 542 the geographical location of the apparatus 800 associated with the recipient 560, and the UAV 530 may employ same to travel to the apparatus 800.

When the UAV 530 comes proximate (e.g., within twenty or so feet of) the apparatus 800 (e.g., the housing 822 thereof), the apparatus verification module 546 of the UAV software 542 (see FIG. 5) may ensure that the package 814 being delivered is to be delivered to the particular apparatus 800.

The apparatus verification module 546 (FIG. 5) may employ the verification device 540 to verify that the package is being delivered to the intended apparatus 800. For example, in an embodiment, each apparatus 800 may have a unique visible (or other) marker(s) 803A (FIG. 8C), and the verification device 540 may read or otherwise evaluate same to confirm that the package 814 is delivered to the intended apparatus 800. The marker 803A may be passive or active. For instance, the marker 803A may be an LED or other light source that blinks at a particular frequency (which frequency may but need not be perceptible to the naked eye) and the verification device 540 may comprise a light sensor configured to read the light pattern to verify the particular apparatus 800. Alternately or in addition, the marker 803A may be a two or three dimensional symbol (such as a barcode, a target, cross-hairs, etc.). Or, for example, the marker 803A may produce a unique sound and the UAV verification device 540 may include an audible sensor that is able to match said sound to the particular apparatus 800. Or, for instance, the electronics 824 may include a beacon (e.g., an RFID, Bluetooth, or other beacon) and the UAV 530 may include a decoder that decodes the signal transmitted by the beacon to confirm the identity of the apparatus 800.

In embodiments, the apparatus 800, and specifically the UAV identification module 906 thereof, may likewise verify that the UAV 530 is an unmanned vehicle authorized to deliver packages to the apparatus 800. In embodiments, once the apparatus 800 has verified the UAV 530, a record of same may be stored at a remote location and/or in the memory 902 for posterity.

As discussed above for apparatus 100, the UAV identification module 906 may identify the UAV 530 to ensure that the unmanned aerial vehicle is authorized to deliver a package to the package receiver 802 in one of any number of ways. In embodiments, the communication device 536 of the UAV may communicate a uniquely encoded signal to the apparatus 502, and the signal, once received by the network interface 918, may be decoded by the UAV verification module 906 to approve the delivery of the package by the unmanned aerial vehicle 530. As discussed above for apparatus 100, in some embodiments, the package receiver software 903 may include a gesture recognizer 522 that may function together with the camera 914 or other sensor to recognize a particular gesture made by the UAV 530 to authorize the delivery of the package thereby.

Once the apparatus verification module 546 of the UAV software 542 has verified the apparatus 800 and/or the UAV verification module 906 of the package receiver software 904 has verified the UAV 530, the package drop off module 548 may cause the UAV to drop off the package(s) into the package receiving area 810 of the package receiver 802. For example, the package holding apparatus of the UAV 530 may, in response to a communication by the package drop off module 548, cause the package to be lowered (or otherwise dropped) into the package receiving area 810.

The sensor 916 may be a machine code reader (e.g., a barcode scanner), a weight measuring sensor, or other sensor that allows the package receiver computer 903 to determine at least one characteristic of the package 814 dropped off into the package receiving area 810. For example, in some embodiments, the package being dropped off the by UAV 530 may have a barcode or other machine readable indicia and the sensor 916 may read same so as to allow the notification module 910 to determine the contents of (or other information about) the package 814. Alternately or additionally, the sensor 916 may determine the weight of the package and the notification module 910 may compare same to the expected weight of the package 814 that is to be delivered to the apparatus 800. Such may provide further confidence that the appropriate package has now been delivered to the apparatus 800. In addition, the sensor 916 may determine the weight of the package 814 to determine if two or more packages have been delivered to the apparatus 800; and if so, the notification module 910 may communicate this information to the user 560 via the personal computer 562 of the user 560. In some embodiments, the leveling module 912 may employ data from the sensors 916 (e.g., the weight sensors and associated actuators) to ensure that the package receiver 802 is appropriately leveled so as to not undesirably drop the package 814 onto the ground.

The notification module 910 may notify the user 560 that a package has been received in the package receiver 802. For example, the notification module 910 may employ the network interface 918 to send the alert module 576 of the personal computer 562 a message outlining that the package has been received. The alert module 576 may, for example, ring, beep, vibrate, etc., to convey to the user 560 that a package has been delivered to the apparatus 800. Alternately, the notification module 520 may send a text message, e-mail, voicemail, etc., to the user 560 to apprise the user of the delivery of the package 814.

Figure 8E:
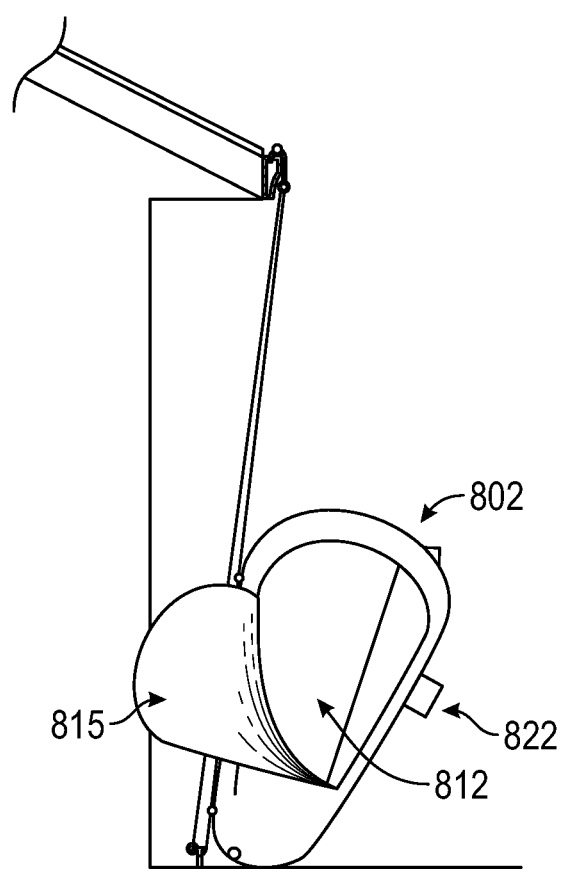
FIG. 8E is yet another side view of the apparatus of FIG. 8A and shows an openable section therein having been opened to retrieve a package.

The user 560 may, in response to a notification by the notification module 520 (or otherwise), use the elevating means 807 (e.g., the rope 808) to lower the package receiver 802, as shown in FIG. 8E. The user 560 may then access the package receiving area 810, and specifically the cavity 812, by unzipping (or otherwise unlatching) the openable section 815 and retrieve the package 814 from the package 814 receiver 802.

Power to the apparatus 800, e.g., to the package receiver computer 903 and its associated components, may be provided in one or more of any number of ways. In an embodiment, standard AC power from the building 10 may be used to the power the apparatus 800 (and the other apparatuses discussed above). In some embodiments, a rechargeable or other battery may be used to power the apparatus 800 (and the other apparatuses described above). Alternately or in addition, the apparatus 800 (and the other apparatuses above) may include an energy harvester 917 (such as solar cells or other energy harvesting devices) that is controlled by the energy harvesting module 908 to harvest energy and provide appropriate power to the apparatus 800.

After the package (or packages) 814 has been retrieved by the user 560, the user 560 may collapse the package receiver 802 again and place it in the closed position 802C. If desired, the user 560 may further removably couple the package receiver 802 to the ground or other such surface until the next package delivery is due. The route optimizer 547 and the package analyzer 537 (of the UAV software 542) may function as described above for the apparatus 100. Similarly, the UAV guiding module 511, the thermal manager 909, the temperature control element 919, etc., may function in line with the corresponding elements discussed above for apparatus 100.

Figure 13:
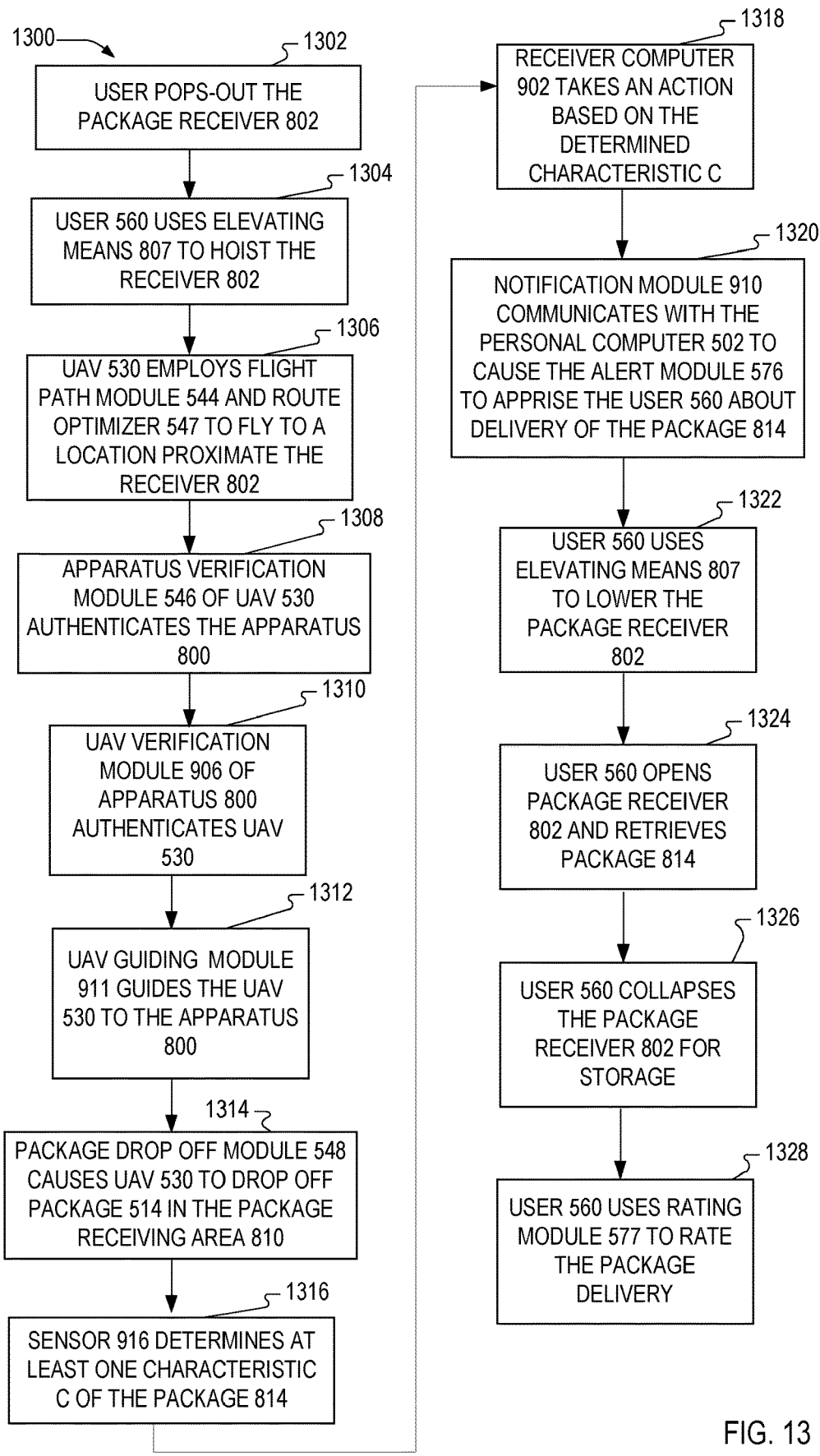
FIG. 13 shows a flowchart illustrating an example method of using the package receiving apparatus of FIGS. 8A-8E.

FIG. 13 shows an example process 1300 whereby the package receiving apparatus 800 receives the package 814 from the UAV 530. The apparatus 800, and specifically the package receiver 802 thereof, may initially be in the closed or stored position 802C (FIG. 8A).

At step 1302, the user 560 expecting to receive the package 814 may pop-out the package receiver 802 (e.g., after removing the stake 809, for example, as shown in FIG. 8B). At step 1304, the user 560 may use the elevating means 807 (e.g., the rope 808 and pulley 806) to hoist the receiver 802 so that the UAV 530 may deposit the package 814 therein (see FIG. 8C).

At step 1306, the UAV 530 may use the flight path module 544 (and in embodiments, the route optimizer 547) to fly from the location of the sender (or elsewhere) to a location proximate the apparatus 800. At step 1308, the UAV 530 may use the apparatus verification module 546 to authenticate the apparatus 100 and ensure that the package 814 is being delivered to the appropriate apparatus 800. At step 1310 (which may, in embodiments, occur prior to step 1308), the apparatus 800 may use the UAV verification module 906 to authenticate the UAV 530.

At step 1312, once the bidirectional authentication is complete, the UAV guiding module 911 may guide the UAV 530 to the apparatus 800 (e.g., guide the UAV 530 around any temporary or permanent obstacles in the path of the UAV 530). At step 1314, once the UAV 530 is properly aligned with the apparatus 100 so as to deposit the package 814 thereto, the package drop off module 548 may cause the UAV 530 to deposit the package 814 in the package receiving area 810 (e.g., cavity 812) of the receiver 802.

At step 1316, the UAV 530 may use the sensor 916 to determine a characteristic C of the package 814 so that the same may be communicated to the user 560. Alternately or in addition, and as discussed above, the UAV 530 may determine at least one characteristic C of the package 814 and communicate same to the package receiver computer 902. At step 1318, the receiver computer 902 may take an action based on the determined characteristic C. For example, where the UAV 530 determines via the sensor 916 and associated software (e.g., upon reading a barcode on the package 814) that the package 814 contains pizza, the thermal manager 909 of the package receiver software 904 may employ the temperature control element 919 to increase the temperature of the package receiving area 810 so as to keep the pizza warm. While not expressly shown in the flowchart on FIG. 13, if desired, the leveling module 912 may cause the receiver 802 to become level or relatively level with the ground to ensure that the package 814 does not inadvertently fall onto the ground.

At step 1320, the notification module 910 may wirelessly communicate with the personal computer 562 to notify the user 560 that the package 814 has been received in the package receiver 802. For instance, the notification module 910 of the receiver 802 may cause the alert module 576 of the personal computer 562 to generate an alert (e.g., a ring) to apprise the user 560 of the delivery of the package 814.

At step 1322, the user 560 may use the elevating means 807 to lower the package receiver 802. The user 560 may then at step 1324 open the openable section 815 and retrieve the package 814. The user 560 may then collapse the package receiver 802 as shown in FIG. 8A for storage at step 1326. If desired, at step 1328, the user 560 may use the rating module 577 to rate the package 814 and/or the delivery thereof by the UAV 530. The method 1300 may then end until the next package deliver is due.

Figure 10:
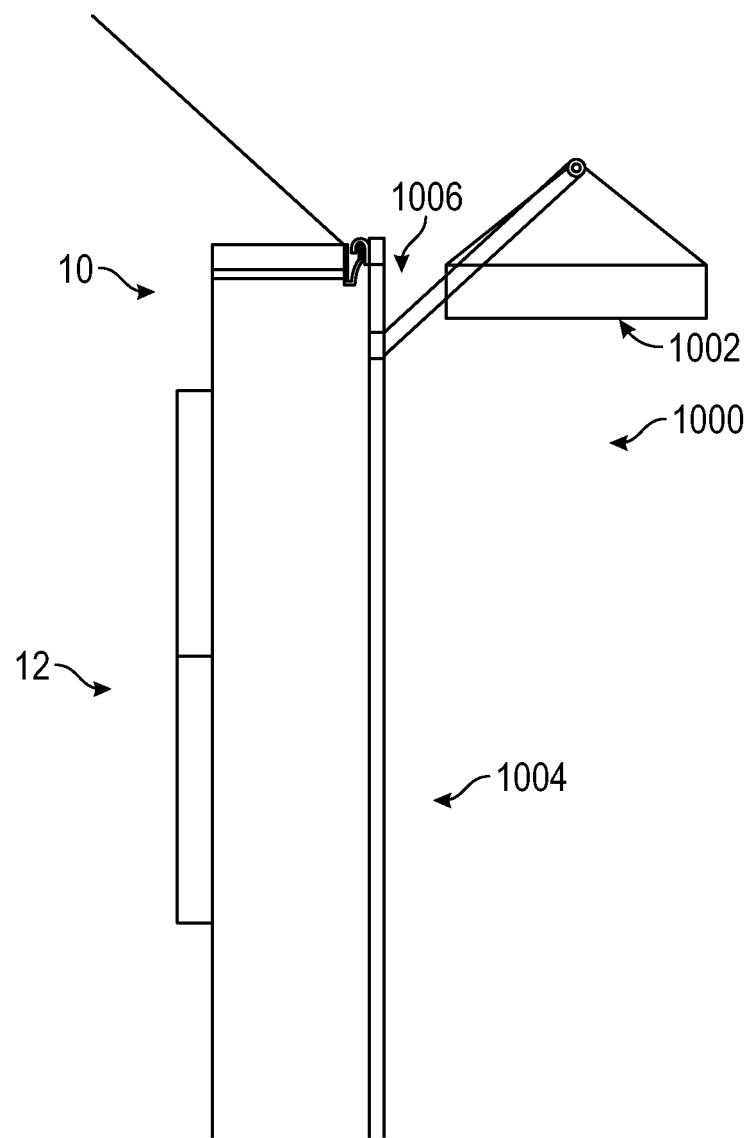
FIG. 10 shows a side view of another embodiment of the package receiving apparatus of FIGS. 8A-8E.

Attention is directed now to FIG. 10, which shows an alternate embodiment 1000 of the package receiving apparatus 800. The package receiving apparatus 1000 may be similar to the package receiving apparatus 800, except as specifically noted and/or shown, or as would be inherent. Further, those skilled in the art will appreciate that the apparatus 800 (and thus the apparatus 1000) may be modified in various ways, such as through incorporating all or part of any of the various described embodiments, for example. For uniformity and brevity, corresponding reference numbers may be used to indicate corresponding parts, though with any noted deviations.

A primary difference between the apparatus 800 and the apparatus 1000 may be that unlike the elevating means 807 (e.g., the rope 808 and pulley 806 or other elevating means), the apparatus 1000 may employ a pole 1004 to which a package receiver 1002 is movably coupled. The package receiver 1002 may be a basket, a tray, the package receiver 802, or any other container configured to receive a package.

In more detail, the pole 1004 may have a movable arm 1006 to which the package receiver 1002 is coupled. The movable arm 1006, akin to a flag, may be caused to be raised and lowered along the pole 1004 (using a rope, for example, or automatically via rollers other means). The arm 1006 may, in its initial position, be proximate the ground (or other such) surface. When the user 560 expects a package delivery, the user 560 may raise the movable arm 1006 along the pole 1004 to elevate the package receiver 1002 (or alternately, machine controllable wheels etc., may be provided that allow the receiver 1002 to be elevated for receiving a package). The UAV 530 may deliver the package 814 to the package receiver 1002, and the user 560 may thereafter lower the receiver 1002 along the pole 1004 and retrieve the package 814. As discussed above for other embodiments, the package receiver 1002 may include one or more sensors and associated software that allow the recipient and/or the UAV 530 to desirably communicate with the apparatus 1000. The pole 1004 may be a free standing pole or may be coupled to the building 10. In embodiments, the window receiving apparatus (e.g., an awning, a basket or other container, etc.) may be disposed on a traditional flag pole.

Figure 11B:
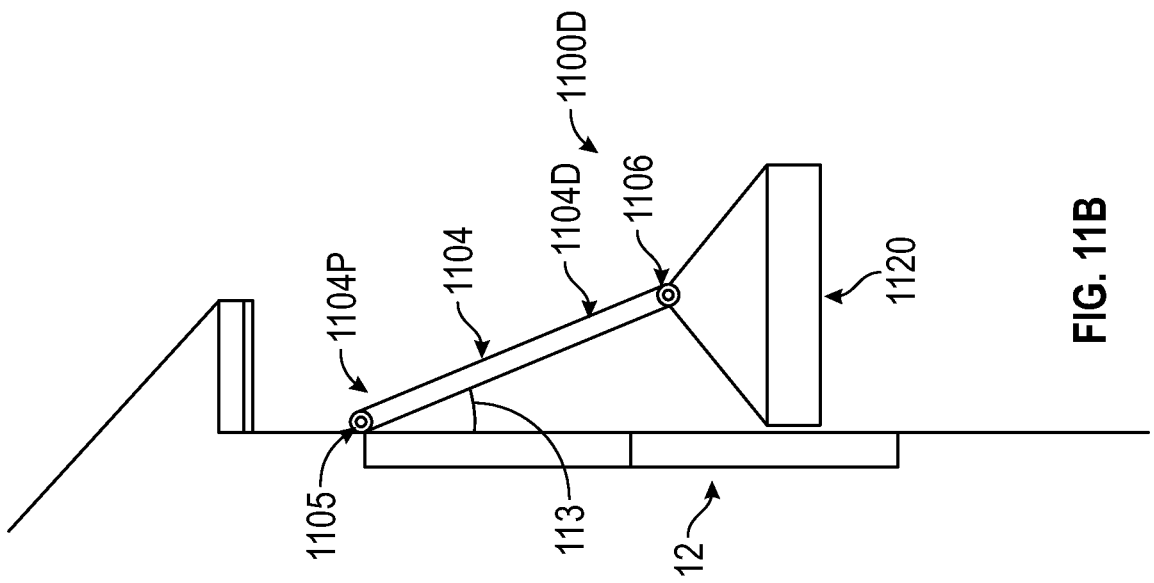
FIG. 11B shows a side view of the package receiving apparatus of FIG. 11A, and shows the apparatus in a package delivering position.
Figure 11A:
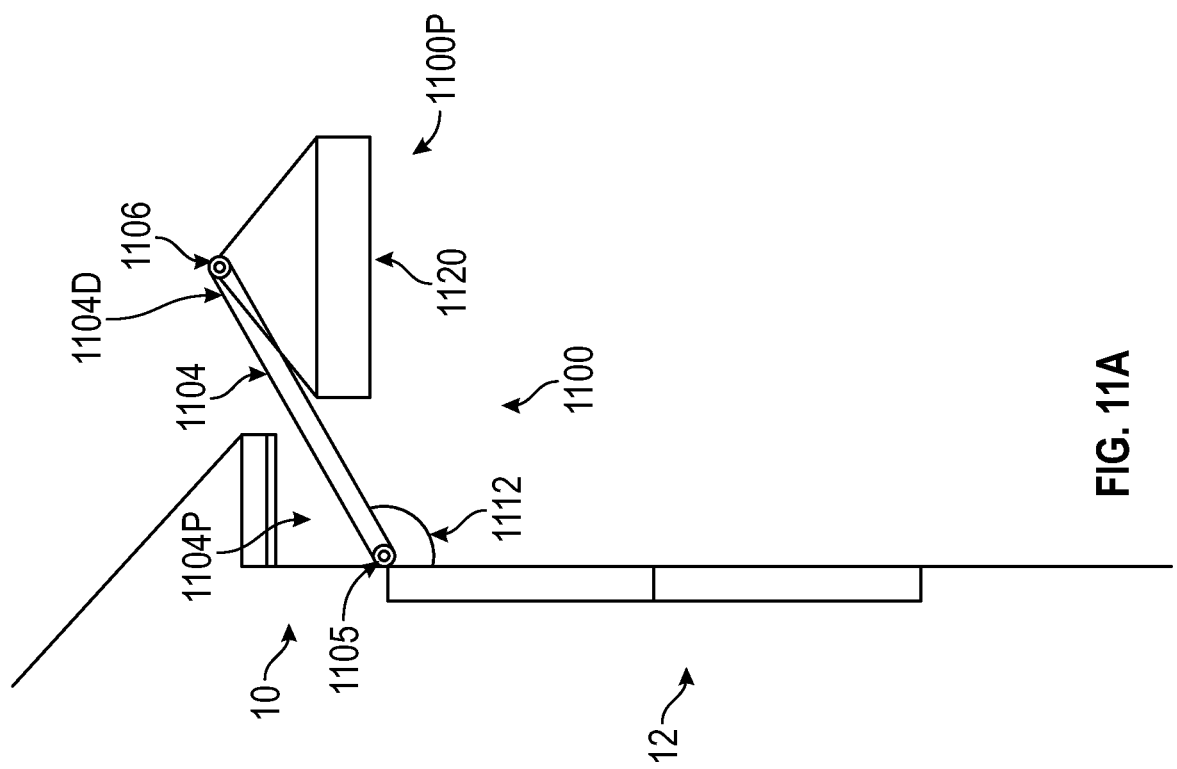
FIG. 11A shows a side view of another embodiment of the package receiving of FIGS. 8A-8E, and illustrates the apparatus in a package receiving position.

Focus is directed now to FIGS. 11A-11B, which show an alternate embodiment 1100 of the package receiving apparatus 1000. The package receiving apparatus 1100 may be similar to the package receiving apparatus 1000, except as specifically noted and/or shown, or as would be inherent. Further, those skilled in the art will appreciate that the apparatus 1000 (and thus the apparatus 1100) may be modified in various ways, such as through incorporating all or part of any of the various described embodiments, for example. For uniformity and brevity, corresponding reference numbers may be used to indicate corresponding parts, though with any noted deviations.

The package receiving apparatus 1100 is shown in FIG. 11A in a package receiving position 1100P, and in shown in FIG. 11B in a package delivery position 1100D. The package receiving apparatus 1100 may include a movable arm 1104. The arm 104 may have a proximal side 1104P proximate the window 12 and a distal side 1104D further away from the window 12. The arm 1104 may be pivotably coupled to the building 10, such as above the window 12 or elsewhere. Specifically, the arm 1104, at its proximal side 1104P, may be rotatably coupled to the building via a hinge 1105. The apparatus 1110 may include electronics as discussed above for other embodiments, and the arm 1104 may be controlled by these electronics (e.g., a motor, actuator, etc.). At its distal side 1104D, the arm 1104 may have pivotably coupled thereto a self-leveling basket (or other container) 1120 via a hinge 1106.

In more detail, in the package receiving position 1100P, the electronics may cause the arm 1104 to be raised above the window 12 to receive a package from the UAV 530. In this configuration, the arm distal side 1104D, in the vertical plane, may be higher than the arm proximal side 1104P, and the arm 1104 may make an angle 1112 with the vertical plane. The UAV 530 may drop off the package in the self-leveling basket 1120. If the UAV 530 drops the package in one side of the basket 1120 (e.g., on the left side or the right side, as opposed to in the center of the basket), the basket 1120 may automatically level itself (i.e., become generally parallel to the ground surface) to ensure that the package is securely retained therein. For example, the electronics may cause the hinge 1106 to rotate in a clockwise or counterclockwise direction as desired to cause the basket 1120 to become generally level with the ground surface.

When the user 560 wishes to retrieve the package 814, he may use the personal computer 562, e.g., an application downloaded thereon, to cause the arm 1104 to be lowered. Specifically, the user 560 may cause the arm 1104 to rotate in a clockwise direction such that the arm distal side 1104D is now below the arm proximal side 1104P in the vertical plane. In this package delivery configuration 1110D, the arm 1104 may make an angle 1113 with the vertical plane, which may be smaller than the angle 1112. In embodiments, the angle 1112 may be an obtuse angle (e.g., 130 degrees) and the angle 1113 may be an acute angle (e.g., 30 degrees).

The arm 1104 may be configured such that in the package delivery position 1100D the basket 1120 is proximate (e.g., outwardly adjacent) the window 12 and accessible therefrom. The user 560 may open the window 12 to access the basket 1120 and retrieve the package 814. The apparatus 1100 may then automatically, or on user command, go back to the package receiving position 1110P so that the view from the window 12 is largely unobstructed.

Figure 12:
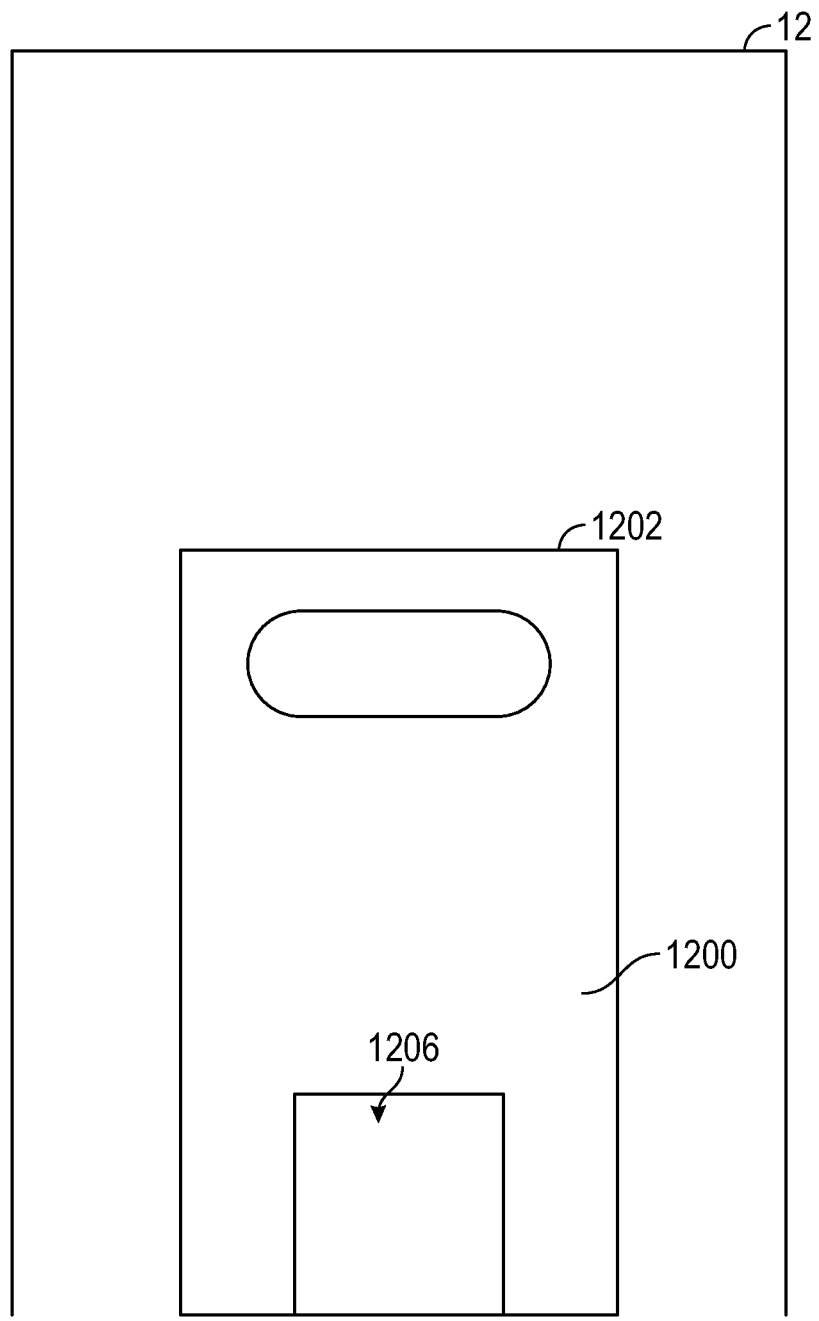
FIG. 12 shows a front view of yet another embodiment of the package receiving apparatus of FIGS. 8A-8E.

Attention is directed now to FIG. 12, which show yet another alternate embodiment 1200 of the package receiving apparatus 1000. The package receiving apparatus 1200 may be similar to the package receiving apparatus 1000, except as specifically noted and/or shown, or as would be inherent. Further, those skilled in the art will appreciate that the apparatus 1000 (and thus the apparatus 1200) may be modified in various ways, such as through incorporating all or part of any of the various described embodiments, for example. For uniformity and brevity, corresponding reference numbers may be used to indicate corresponding parts, though with any noted deviations.

All the apparatuses discussed above are configured to receive packages from unmanned aerial vehicles. The package receiving apparatus 1200, conversely, may be configured to receive packages from unmanned vehicles that travel on the ground. The package receiving apparatus 1200 may be configured on a door 1202 of the building 10. For example, akin to a pet door, the apparatus 1200 may comprise a slidable panel 1206 configured at a bottom side of the door 1202. The panel 1206 may have associated therewith electronics as discussed above, such as sensors (e.g., a weight sensor), communication devices (e.g., an RFID, Bluetooth, or Wi-Fi device to communicate with the unmanned vehicle and/or the recipient upon delivery of the package), actuators (e.g., a motor to open the panel 1206 so that the package can be deposited inside the building through the panel 1206, and to close the panel 1206 once the delivery has been made), etc.

In some embodiments, instead of being configured on the door 1202 of the building 10, the package receiving apparatus 1200 may be configured elsewhere proximate the building 12 (e.g., in a dog house or in another structure (e.g., a dedicated structure)) proximate the building 10 and may be adapted to receive and secure packages delivered by unmanned vehicles. In embodiments, the door 1202 may be a garage door, a storm door (or window), or other such structure.

The unmanned vehicle carrying the package may come proximate the apparatus 1200. Communication, which may be bidirectional, may then be effectuated to confirm that the package is to be delivered to the particular apparatus 1200. For example, as discussed above for other embodiments, the apparatus 1200 may include flashing lights that flash at a unique frequency and the unmanned vehicle may evaluate this signal to confirm that the package is to be delivered to the apparatus 1200. Once the authentication is complete, the panel 1206 may automatically slide open (e.g., outwards) to allow the unmanned vehicle to deliver a package through the opening created by the slidable panel 1206. When the delivery is complete, the panel 1206 may close to secure the package within the building 10. In embodiments, and as discussed above for other apparatuses, the apparatus 1200 may apprise the user 560 via his personal computer 562 that the package 814 has been delivered.

The disclosure above focuses, in general, on unmanned vehicles that travel in the air or on land. The skilled artisan will appreciate, however, that the disclosure is not so limited, and that other unmanned vehicles (e.g., unmanned vehicles that travel on or under water, unmanned vehicles configured to or capable of traveling in vacuum or other gas filled areas, unmanned vehicles that can travel both on land and on/in water, etc.) may likewise be employed. For example, in an embodiment, an unmanned vehicle may be used to deliver a package or other item (e.g., a drink) to a user on a lake, a deck, a hot-tub, a backyard, a pool, etc. In some embodiments, the unmanned vehicle may communicate with an electronic device (e.g., a cell phone) uniquely associated with a user and use same to locate and deliver an item (e.g., a snack) directly to the user.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all steps listed in the various figures need be carried out in the specific order described.

The invention claimed is:

1. An apparatus for receiving a package delivered by an unmanned aerial vehicle, comprising:
   a collapsible package receiver comprising fabric and configured to be selectively placed in a collapsed position on a ground surface for storage and an expanded position in preparation for receiving said package from said unmanned aerial vehicle;
   an elevating mechanism comprising a lower supporting member coupled to said ground surface, an upper supporting member coupled to a structure, and a cord extending therebetween; said elevating mechanism configured to allow said collapsible package receiver to be: (a) elevated from said ground surface via said cord and along said structure after said collapsible package receiver has been placed from said collapsed position to said expanded position; and (b) lowered along said structure after said package has been received within a cavity of said collapsible package receiver; and
   a securing member configured to removably couple said collapsible package receiver to said ground surface for storage.

2. The apparatus of claim 1, further comprising a processor and a sensor, said processor configured for leveling said package receiver upon receipt of said package.

3. The apparatus of claim 2, wherein said collapsible package receiver includes a light source configured to blink at a predetermined frequency, said light source configured to identify said collapsible package receiver to said unmanned aerial vehicle.

4. The apparatus of claim 1, wherein said collapsible package receiver includes a zipper.

5. The apparatus of claim 1, wherein said structure is one of a residential building and a commercial building.

6. The apparatus of claim 1, further comprising a processor and a memory storing instructions; said processor configured to execute said instructions to determine a characteristic of said package.

7. The apparatus of claim 1, further comprising a processor and a memory storing instructions; said processor configured to execute said instructions to maintain a temperature of said package while said package is retained within said cavity.

8. The apparatus of claim 1, wherein said collapsible package receiver is configured to receive said package only in said expanded position.

9. The apparatus of claim 1, wherein said collapsible package receiver is configured to be lowered along said structure in said expanded position.

10. The apparatus of claim 1, wherein said collapsible package receiver comprises openings in a bottom surface configured to drain rain water.

11. A package receiver system for receiving a package delivered by an unmanned aerial vehicle, comprising:
    a collapsible package receiver configured to be selectively placed on a ground surface in a collapsed position for storage and an expanded position in preparation for receiving said package from said unmanned aerial vehicle; and
    an elevating mechanism comprising supporting members with a cord extending therebetween, one of said supporting members coupled to said ground surface, and another of said supporting members coupled to one of a roof, a gutter, or elsewhere on a building, said elevating mechanism configured to elevate said collapsible package receiver from said ground surface via said cord after said collapsible package receiver is placed from said collapsed position to said expanded position;
    wherein, said collapsible package receiver is configured to be removably secured to said ground surface in said collapsed position for storage.

12. The package receiver system of claim 11, wherein said collapsible package receiver includes a cavity for receiving and retaining said package.

13. The package receiver system of claim 12, wherein said cavity is accessible from a top of said collapsible package receiver and is selectively accessible from a side of said collapsible package receiver.

14. The package receiver system of claim 13, wherein said collapsible package receiver comprises a zipper.

15. The package receiver system of claim 11, wherein said collapsible package receiver includes a light source configured to blink at a predetermined frequency, said light source configured to identify said collapsible package receiver to said unmanned aerial vehicle.

16. The package receiver system of claim 11, further comprising a processor and a sensor, said processor configured for leveling said package receiver upon receipt of said package.

17. The package receiver system of claim 11, further comprising a processor and a memory storing instructions; said processor configured to execute said instructions to read an indicia on said package.

18. The package receiver system of claim 11, further comprising a processor and a memory storing instructions; said processor configured to execute said instructions to level said package receiver after reception of said package.

19. A package receiver system for receiving a package delivered by an unmanned vehicle, comprising:
    a collapsible package receiver configured to be selectively placed in a collapsed position on a ground surface for storage and an expanded position for receiving said package from said unmanned vehicle; and
    an elevating mechanism comprising supporting members and a cord extending therebetween, one of said supporting members coupled to said ground surface, another of said supporting members coupled to a building, said elevating mechanism configured to elevate said collapsible package receiver from said ground surface to receive said package after said collapsible package receiver is placed from said collapsed position to said expanded position;

wherein:
said collapsible package receiver is configured to be removably secured to said ground surface for storage.
20. The package receiver of claim 19, wherein said collapsible package receiver comprises a foldable tent.

* * * * *